(12) United States Patent
Berlin et al.

(10) Patent No.: US 9,184,843 B2
(45) Date of Patent: Nov. 10, 2015

(54) DETERMINING PROPAGATION DELAY OF COMMUNICATIONS IN DISTRIBUTED ANTENNA SYSTEMS, AND RELATED COMPONENTS, SYSTEMS, AND METHODS

(71) Applicant: CORNING CABLE SYSTEMS LLC, Hickory, NC (US)

(72) Inventors: Igor Berlin, Potomac, MD (US); Dragan Pikula, Horseheads, NY (US); Michael Sauer, Corning, NY (US); Gerald B. Schmidt, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 184 days.

(21) Appl. No.: 14/062,289

(22) Filed: Oct. 24, 2013

(65) Prior Publication Data
US 2014/0050482 A1 Feb. 20, 2014

Related U.S. Application Data

(63) Continuation of application No. PCT/US2012/034853, filed on Apr. 25, 2012.

(60) Provisional application No. 61/480,700, filed on Apr. 29, 2011.

(51) Int. Cl.
*H04B 10/00* (2013.01)
*H04B 10/2575* (2013.01)
(Continued)

(52) U.S. Cl.
CPC .......... *H04B 10/25759* (2013.01); *H04B 7/155* (2013.01); *H04B 17/104* (2015.01); *H04W 56/0055* (2013.01); *H04B 17/40* (2015.01); *H04W 88/085* (2013.01)

(58) Field of Classification Search
CPC .............. H04B 10/2575; H04B 10/25753; H04B 10/25754; H04B 10/25758; H04B 10/25752; H04B 10/25759
See application file for complete search history.

(56) References Cited

U.S. PATENT DOCUMENTS

| | | |
|---|---|---|
| 4,365,865 A | 12/1982 | Stiles |
| 4,449,246 A | 5/1984 | Seiler et al. |

(Continued)

FOREIGN PATENT DOCUMENTS

| | | |
|---|---|---|
| AU | 645192 B | 10/1992 |
| AU | 731180 B2 | 3/1998 |

(Continued)

OTHER PUBLICATIONS

Girard, et al., Indoor Pedestrian Navigation Using Foot-Mounted IMU and Portable Ultrasound Range Sensors, www.mdpi.com/journal/sensors, Aug. 2, 2011, pp. 7606-7624.
(Continued)

*Primary Examiner* — Daniel Dobson

(57) ABSTRACT

Components, systems, and methods for determining propagation delay of communications in distributed antenna systems are disclosed. The propagation delay of communications signals distributed in the distributed antenna systems is determined. If desired, the propagation delay(s) can be determined on a per remote antenna unit basis for the distributed antenna systems. The propagation delay(s) can provided by the distributed antenna systems to a network or other system to be taken into consideration for communications services or operations that are based on communications signal delay. As another non-limiting example, propagation delay can be determined and controlled for each remote antenna unit to be uniquely distinguish the remote antenna units. In this manner, the location of a client device communicating with a remote antenna unit can be determined within the communication range of the remote antenna unit.

27 Claims, 15 Drawing Sheets

(51) Int. Cl.
  *H04B 7/155*   (2006.01)
  *H04W 56/00*   (2009.01)
  *H04B 17/10*   (2015.01)
  *H04W 88/08*   (2009.01)
  *H04B 17/40*   (2015.01)

(56) References Cited

U.S. PATENT DOCUMENTS

| | | |
|---|---|---|
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,602,903 A | 2/1997 | LeBlanc et al. ................ 379/60 |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A * | 9/1998 | Naidu et al. ................ 455/67.16 |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,873,040 A | 2/1999 | Dunn et al. ................... 455/456 |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,365 B1 | 5/2001 | LeBlanc et al. ................ 342/457 |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,249,252 B1 | 6/2001 | Dupray ........................ 342/450 |
| 6,268,946 B1 | 7/2001 | Larkin |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |

(56) References Cited

U.S. PATENT DOCUMENTS

| | | |
|---|---|---|
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Martin et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,876,945 B2 | 4/2005 | Emord ............... 702/150 |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. ............... 342/463 |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,952,181 B2 | 10/2005 | Karr et al. ............... 342/457 |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |

(56) References Cited

U.S. PATENT DOCUMENTS

| | | | |
|---|---|---|---|
| 7,072,586 B2 | 7/2006 | Aburakawa et al. | |
| 7,082,320 B2 | 7/2006 | Kattukaran et al. | |
| 7,084,758 B1 | 8/2006 | Cole | 340/539.11 |
| 7,084,769 B2 | 8/2006 | Bauer et al. | |
| 7,093,985 B2 | 8/2006 | Lord et al. | |
| 7,103,119 B2 | 9/2006 | Matsuoka et al. | |
| 7,103,377 B2 | 9/2006 | Bauman et al. | |
| 7,106,252 B2 | 9/2006 | Smith et al. | |
| 7,106,931 B2 | 9/2006 | Sutehall et al. | |
| 7,110,795 B2 | 9/2006 | Doi | |
| 7,114,859 B1 | 10/2006 | Tuohimaa et al. | |
| 7,127,175 B2 | 10/2006 | Mani et al. | |
| 7,127,176 B2 | 10/2006 | Sasaki | |
| 7,142,503 B1 | 11/2006 | Grant et al. | |
| 7,142,535 B2 | 11/2006 | Kubler et al. | |
| 7,142,619 B2 | 11/2006 | Sommer et al. | |
| 7,146,506 B1 | 12/2006 | Hannah et al. | |
| 7,160,032 B2 | 1/2007 | Nagashima et al. | |
| 7,171,244 B2 | 1/2007 | Bauman | |
| 7,183,910 B2 | 2/2007 | Alvarez et al. | 340/539.13 |
| 7,184,728 B2 | 2/2007 | Solum | |
| 7,190,748 B2 | 3/2007 | Kim et al. | |
| 7,194,023 B2 | 3/2007 | Norrell et al. | |
| 7,194,275 B2 | 3/2007 | Bolin et al. | 455/456.6 |
| 7,199,443 B2 | 4/2007 | Elsharawy | |
| 7,200,305 B2 | 4/2007 | Dion et al. | |
| 7,200,391 B2 | 4/2007 | Chung et al. | |
| 7,228,072 B2 | 6/2007 | Mickelsson et al. | |
| 7,263,293 B2 | 8/2007 | Ommodt et al. | |
| 7,269,311 B2 | 9/2007 | Kim et al. | |
| 7,280,011 B2 | 10/2007 | Bayar et al. | |
| 7,286,843 B2 | 10/2007 | Scheck | |
| 7,286,854 B2 | 10/2007 | Ferrato et al. | |
| 7,295,119 B2 | 11/2007 | Rappaport et al. | |
| 7,298,327 B2 | 11/2007 | Dupray et al. | 342/451 |
| 7,310,430 B1 | 12/2007 | Mallya et al. | |
| 7,313,415 B2 | 12/2007 | Wake et al. | |
| 7,315,735 B2 | 1/2008 | Graham | 455/404.1 |
| 7,324,730 B2 | 1/2008 | Varkey et al. | |
| 7,336,961 B1 | 2/2008 | Ngan | 455/456.1 |
| 7,343,164 B2 | 3/2008 | Kallstenius | |
| 7,348,843 B1 | 3/2008 | Qiu et al. | |
| 7,349,633 B2 | 3/2008 | Lee et al. | |
| 7,359,408 B2 | 4/2008 | Kim | |
| 7,359,674 B2 | 4/2008 | Markki et al. | |
| 7,366,150 B2 | 4/2008 | Lee et al. | |
| 7,366,151 B2 | 4/2008 | Kubler et al. | |
| 7,369,526 B2 | 5/2008 | Lechleider et al. | |
| 7,379,669 B2 | 5/2008 | Kim | |
| 7,388,892 B2 | 6/2008 | Nishiyama et al. | |
| 7,392,025 B2 | 6/2008 | Rooyen et al. | |
| 7,392,029 B2 | 6/2008 | Pronkine | |
| 7,394,883 B2 | 7/2008 | Funakubo et al. | |
| 7,395,181 B2 | 7/2008 | Foxlin | 702/155 |
| 7,403,156 B2 | 7/2008 | Coppi et al. | |
| 7,409,159 B2 | 8/2008 | Izadpanah | |
| 7,412,224 B2 | 8/2008 | Kotola et al. | |
| 7,424,228 B1 | 9/2008 | Williams et al. | |
| 7,444,051 B2 | 10/2008 | Tatat et al. | |
| 7,450,853 B2 | 11/2008 | Kim et al. | |
| 7,450,854 B2 | 11/2008 | Lee et al. | |
| 7,451,365 B2 | 11/2008 | Wang et al. | |
| 7,454,222 B2 | 11/2008 | Huang et al. | |
| 7,460,507 B2 | 12/2008 | Kubler et al. | |
| 7,460,829 B2 | 12/2008 | Utsumi et al. | |
| 7,460,831 B2 | 12/2008 | Hasarchi | |
| 7,466,925 B2 | 12/2008 | Iannelli | |
| 7,469,105 B2 | 12/2008 | Wake et al. | |
| 7,477,597 B2 | 1/2009 | Segel | |
| 7,483,504 B2 | 1/2009 | Shapira et al. | |
| 7,483,711 B2 | 1/2009 | Burchfiel | |
| 7,496,070 B2 | 2/2009 | Vesuna | |
| 7,496,384 B2 | 2/2009 | Seto et al. | |
| 7,505,747 B2 | 3/2009 | Solum | |
| 7,512,419 B2 | 3/2009 | Solum | |
| 7,522,552 B2 | 4/2009 | Fein et al. | |
| 7,525,484 B2 | 4/2009 | Dupray et al. | 342/450 |
| 7,535,796 B2 | 5/2009 | Holm et al. | 367/100 |
| 7,539,509 B2 | 5/2009 | Bauman et al. | |
| 7,542,452 B2 | 6/2009 | Penumetsa | |
| 7,546,138 B2 | 6/2009 | Bauman | |
| 7,548,138 B2 | 6/2009 | Kamgaing | |
| 7,548,695 B2 | 6/2009 | Wake | |
| 7,551,641 B2 | 6/2009 | Pirzada et al. | |
| 7,557,758 B2 | 7/2009 | Rofougaran | |
| 7,580,384 B2 | 8/2009 | Kubler et al. | |
| 7,586,861 B2 | 9/2009 | Kubler et al. | |
| 7,590,354 B2 | 9/2009 | Sauer et al. | |
| 7,593,704 B2 | 9/2009 | Pinel et al. | |
| 7,599,420 B2 | 10/2009 | Forenza et al. | |
| 7,599,672 B2 | 10/2009 | Shoji et al. | |
| 7,610,046 B2 | 10/2009 | Wala | |
| 7,630,690 B2 | 12/2009 | Kaewell, Jr. et al. | |
| 7,633,934 B2 | 12/2009 | Kubler et al. | |
| 7,639,982 B2 | 12/2009 | Wala | |
| 7,646,743 B2 | 1/2010 | Kubler et al. | |
| 7,646,777 B2 | 1/2010 | Hicks, III et al. | |
| 7,653,397 B2 | 1/2010 | Pernu et al. | |
| 7,668,565 B2 | 2/2010 | Ylänen et al. | |
| 7,675,936 B2 | 3/2010 | Mizutani et al. | |
| 7,688,811 B2 | 3/2010 | Kubler et al. | |
| 7,693,486 B2 | 4/2010 | Kasslin et al. | |
| 7,697,467 B2 | 4/2010 | Kubler et al. | |
| 7,697,574 B2 | 4/2010 | Suematsu et al. | |
| 7,698,228 B2 | 4/2010 | Gailey et al. | 705/64 |
| 7,714,778 B2 | 5/2010 | Dupray | 342/357.01 |
| 7,715,375 B2 | 5/2010 | Kubler et al. | |
| 7,720,510 B2 | 5/2010 | Pescod et al. | |
| 7,751,374 B2 | 7/2010 | Donovan | |
| 7,751,838 B2 | 7/2010 | Ramesh et al. | |
| 7,751,971 B2 | 7/2010 | Chang et al. | 701/207 |
| 7,760,703 B2 | 7/2010 | Kubler et al. | |
| 7,761,093 B2 | 7/2010 | Sabat, Jr. et al. | |
| 7,764,231 B1 | 7/2010 | Karr et al. | 342/457 |
| 7,768,951 B2 | 8/2010 | Kubler et al. | |
| 7,773,573 B2 | 8/2010 | Chung et al. | |
| 7,778,603 B2 | 8/2010 | Palin et al. | |
| 7,787,823 B2 | 8/2010 | George et al. | |
| 7,805,073 B2 | 9/2010 | Sabat, Jr. et al. | |
| 7,809,012 B2 | 10/2010 | Ruuska et al. | |
| 7,812,766 B2 | 10/2010 | Leblanc et al. | |
| 7,812,775 B2 | 10/2010 | Babakhani et al. | |
| 7,817,969 B2 | 10/2010 | Castaneda et al. | |
| 7,835,328 B2 | 11/2010 | Stephens et al. | |
| 7,848,316 B2 | 12/2010 | Kubler et al. | |
| 7,848,765 B2 | 12/2010 | Phillips et al. | 455/456.3 |
| 7,848,770 B2 | 12/2010 | Scheinert | |
| 7,853,234 B2 | 12/2010 | Afsahi | |
| 7,860,518 B2 | 12/2010 | Flanagan et al. | 455/456.1 |
| 7,860,519 B2 | 12/2010 | Portman et al. | 455/456.3 |
| 7,870,321 B2 | 1/2011 | Rofougaran | |
| 7,880,677 B2 | 2/2011 | Rofougaran et al. | |
| 7,881,755 B1 | 2/2011 | Mishra et al. | |
| 7,894,423 B2 | 2/2011 | Kubler et al. | |
| 7,899,007 B2 | 3/2011 | Kubler et al. | |
| 7,903,029 B2 | 3/2011 | Dupray | 342/457 |
| 7,907,972 B2 | 3/2011 | Walton et al. | |
| 7,912,043 B2 | 3/2011 | Kubler et al. | |
| 7,912,506 B2 | 3/2011 | Lovberg et al. | |
| 7,916,706 B2 | 3/2011 | Kubler et al. | |
| 7,917,177 B2 | 3/2011 | Bauman | |
| 7,920,553 B2 | 4/2011 | Kubler et al. | |
| 7,920,858 B2 | 4/2011 | Sabat, Jr. et al. | |
| 7,924,783 B1 | 4/2011 | Mahany et al. | |
| 7,936,713 B2 | 5/2011 | Kubler et al. | |
| 7,949,364 B2 | 5/2011 | Kasslin et al. | |
| 7,957,777 B1 | 6/2011 | Vu et al. | |
| 7,962,111 B2 | 6/2011 | Solum | |
| 7,969,009 B2 | 6/2011 | Chandrasekaran | |
| 7,969,911 B2 | 6/2011 | Mahany et al. | |
| 7,970,648 B2 | 6/2011 | Gailey et al. | 705/14.49 |
| 7,990,925 B2 | 8/2011 | Tinnakornsrisuphap et al. | |
| 7,996,020 B1 | 8/2011 | Chhabra | |
| 7,996,281 B2 | 8/2011 | Alvarez et al. | 705/27.2 |

(56) References Cited

U.S. PATENT DOCUMENTS

| | | | |
|---|---|---|---|
| 8,005,050 B2 | 8/2011 | Scheinert et al. ............. 370/335 |
| 8,018,907 B2 | 9/2011 | Kubler et al. | |
| 8,023,886 B2 | 9/2011 | Rofougaran | |
| 8,027,656 B2 | 9/2011 | Rofougaran et al. | |
| 8,032,153 B2 | 10/2011 | Dupray et al. ............. 455/456.1 |
| 8,036,308 B2 | 10/2011 | Rofougaran | |
| 8,072,381 B1 | 12/2011 | Ziegler ........................ 342/386 |
| 8,073,565 B2 | 12/2011 | Johnson ....................... 700/245 |
| 8,081,923 B1 | 12/2011 | Larsen et al. ................... 455/18 |
| 8,082,096 B2 | 12/2011 | Dupray ........................ 701/207 |
| 8,082,353 B2 | 12/2011 | Huber et al. | |
| 8,086,192 B2 | 12/2011 | Rofougaran et al. | |
| 8,090,383 B1 | 1/2012 | Emigh et al. ............... 455/456.1 |
| 8,135,102 B2 | 3/2012 | Wiwel et al. | |
| 8,135,413 B2 | 3/2012 | Dupray ...................... 455/456.1 |
| 8,213,264 B2 | 7/2012 | Lee et al. ...................... 367/127 |
| 8,213,401 B2 | 7/2012 | Fischer et al. | |
| 8,223,795 B2 | 7/2012 | Cox et al. | |
| 8,238,463 B1 | 8/2012 | Arslan et al. | |
| 8,270,387 B2 | 9/2012 | Cannon et al. | |
| 8,275,262 B2 | 9/2012 | Cui et al. | |
| 8,290,483 B2 | 10/2012 | Sabat, Jr. et al. | |
| 8,306,563 B2 | 11/2012 | Zavadsky et al. | |
| 8,326,315 B2 | 12/2012 | Phillips et al. ............. 455/456.1 |
| 8,346,278 B2 | 1/2013 | Wala et al. | |
| 8,364,171 B2 | 1/2013 | Busch ....................... 455/456.1 |
| 8,428,510 B2 | 4/2013 | Stratford et al. | |
| 8,462,683 B2 | 6/2013 | Uyehara et al. | |
| 8,472,579 B2 | 6/2013 | Uyehara et al. | |
| 8,509,215 B2 | 8/2013 | Stuart | |
| 8,509,850 B2 | 8/2013 | Zavadsky et al. | |
| 8,526,970 B2 | 9/2013 | Wala et al. | |
| 8,532,242 B2 | 9/2013 | Fischer et al. | |
| 8,626,245 B2 | 1/2014 | Zavadsky et al. | |
| 8,676,214 B2 | 3/2014 | Fischer et al. | |
| 8,737,454 B2 | 5/2014 | Wala et al. | |
| 8,743,718 B2 | 6/2014 | Grenier et al. | |
| 8,743,756 B2 | 6/2014 | Uyehara et al. | |
| 8,774,843 B2 | 7/2014 | Mangold et al. ........... 455/456.1 |
| 8,837,659 B2 | 9/2014 | Uyehara et al. | |
| 8,837,940 B2 | 9/2014 | Smith et al. | |
| 8,873,585 B2 | 10/2014 | Oren et al. | |
| 8,929,288 B2 | 1/2015 | Stewart et al. | |
| 9,107,086 B2 | 8/2015 | Leimeister et al. | |
| 9,112,547 B2 | 8/2015 | Scheinert et al. | |
| 2001/0036163 A1 | 11/2001 | Sabat, Jr. et al. | |
| 2001/0036199 A1 | 11/2001 | Terry | |
| 2002/0003645 A1 | 1/2002 | Kim et al. | |
| 2002/0009070 A1 | 1/2002 | Lindsay et al. | |
| 2002/0012336 A1 | 1/2002 | Hughes et al. | |
| 2002/0012495 A1 | 1/2002 | Sasai et al. | |
| 2002/0016827 A1 | 2/2002 | McCabe et al. | |
| 2002/0045519 A1 | 4/2002 | Watterson et al. | |
| 2002/0048071 A1 | 4/2002 | Suzuki et al. | |
| 2002/0051434 A1 | 5/2002 | Ozluturk et al. | |
| 2002/0075906 A1 | 6/2002 | Cole et al. | |
| 2002/0092347 A1 | 7/2002 | Niekerk et al. | |
| 2002/0097564 A1 | 7/2002 | Struhsaker et al. | |
| 2002/0103012 A1 | 8/2002 | Kim et al. | |
| 2002/0111149 A1 | 8/2002 | Shoki | |
| 2002/0111192 A1 | 8/2002 | Thomas et al. | |
| 2002/0114038 A1 | 8/2002 | Arnon et al. | |
| 2002/0123365 A1 | 9/2002 | Thorson et al. | |
| 2002/0126967 A1 | 9/2002 | Panak et al. | |
| 2002/0128009 A1 | 9/2002 | Boch et al. | |
| 2002/0130778 A1 | 9/2002 | Nicholson | |
| 2002/0181668 A1 | 12/2002 | Masoian et al. | |
| 2002/0190845 A1 | 12/2002 | Moore | |
| 2002/0197984 A1 | 12/2002 | Monin et al. | |
| 2003/0002604 A1 | 1/2003 | Fifield et al. | |
| 2003/0007214 A1 | 1/2003 | Aburakawa et al. | |
| 2003/0016418 A1 | 1/2003 | Westbrook et al. | |
| 2003/0045284 A1 | 3/2003 | Copley et al. | |
| 2003/0069922 A1 | 4/2003 | Arunachalam | |
| 2003/0078074 A1 | 4/2003 | Sesay et al. | |
| 2003/0112826 A1 | 6/2003 | Ashwood Smith et al. | |
| 2003/0126294 A1 | 7/2003 | Thorsteinson et al. | |
| 2003/0141962 A1 | 7/2003 | Barink | |
| 2003/0146871 A1 | 8/2003 | Karr et al. ...................... 342/457 |
| 2003/0157943 A1 | 8/2003 | Sabat, Jr. ...................... 455/456 |
| 2003/0161637 A1 | 8/2003 | Yamamoto et al. | |
| 2003/0165287 A1 | 9/2003 | Krill et al. | |
| 2003/0174099 A1 | 9/2003 | Bauer et al. | |
| 2003/0209601 A1 | 11/2003 | Chung | |
| 2004/0001719 A1 | 1/2004 | Sasaki | |
| 2004/0008114 A1 | 1/2004 | Sawyer | |
| 2004/0017785 A1 | 1/2004 | Zelst | |
| 2004/0037565 A1 | 2/2004 | Young et al. | |
| 2004/0041714 A1 | 3/2004 | Forster | |
| 2004/0043764 A1 | 3/2004 | Bigham et al. | |
| 2004/0047313 A1 | 3/2004 | Rumpf et al. | |
| 2004/0078151 A1 | 4/2004 | Aljadeff et al. | |
| 2004/0095907 A1 | 5/2004 | Agee et al. | |
| 2004/0100930 A1 | 5/2004 | Shapira et al. | |
| 2004/0102196 A1 | 5/2004 | Weckstrom et al. ....... 454/456.1 |
| 2004/0106435 A1 | 6/2004 | Bauman et al. | |
| 2004/0126068 A1 | 7/2004 | Van Bijsterveld | |
| 2004/0126107 A1 | 7/2004 | Jay et al. | |
| 2004/0139477 A1 | 7/2004 | Russell et al. | |
| 2004/0146020 A1 | 7/2004 | Kubler et al. | |
| 2004/0149736 A1 | 8/2004 | Clothier | |
| 2004/0151164 A1 | 8/2004 | Kubler et al. | |
| 2004/0151503 A1 | 8/2004 | Kashima et al. | |
| 2004/0157623 A1 | 8/2004 | Splett | |
| 2004/0160912 A1 | 8/2004 | Kubler et al. | |
| 2004/0160913 A1 | 8/2004 | Kubler et al. | |
| 2004/0162084 A1 | 8/2004 | Wang | |
| 2004/0162115 A1 | 8/2004 | Smith et al. | |
| 2004/0162116 A1 | 8/2004 | Han et al. | |
| 2004/0165573 A1 | 8/2004 | Kubler et al. | |
| 2004/0175173 A1 | 9/2004 | Deas | |
| 2004/0196404 A1 | 10/2004 | Loheit et al. | |
| 2004/0198386 A1 | 10/2004 | Dupray ...................... 455/456.1 |
| 2004/0202257 A1 | 10/2004 | Mehta et al. | |
| 2004/0203703 A1 | 10/2004 | Fischer | |
| 2004/0203704 A1 | 10/2004 | Ommodt et al. | |
| 2004/0203846 A1 | 10/2004 | Caronni et al. | |
| 2004/0204109 A1 | 10/2004 | Hoppenstein | |
| 2004/0208526 A1 | 10/2004 | Mibu | |
| 2004/0208643 A1 | 10/2004 | Roberts et al. | |
| 2004/0215723 A1 | 10/2004 | Chadha | |
| 2004/0218873 A1 | 11/2004 | Nagashima et al. | |
| 2004/0233877 A1 | 11/2004 | Lee et al. | |
| 2004/0246926 A1 | 12/2004 | Belcea et al. ................. 370/332 |
| 2004/0258105 A1 | 12/2004 | Spathas et al. | |
| 2004/0267971 A1 | 12/2004 | Seshadri | |
| 2005/0020309 A1 | 1/2005 | Moeglein et al. .......... 455/456.1 |
| 2005/0052287 A1 | 3/2005 | Whitesmith et al. | |
| 2005/0058451 A1 | 3/2005 | Ross | |
| 2005/0068179 A1 | 3/2005 | Roesner | |
| 2005/0076982 A1 | 4/2005 | Metcalf et al. | |
| 2005/0078006 A1 | 4/2005 | Hutchins | |
| 2005/0093679 A1 | 5/2005 | Zai et al. | |
| 2005/0099343 A1 | 5/2005 | Asrani et al. | |
| 2005/0102180 A1 | 5/2005 | Gailey et al. ...................... 705/14 |
| 2005/0116821 A1 | 6/2005 | Wilsey et al. | |
| 2005/0123232 A1 | 6/2005 | Piede et al. | |
| 2005/0141545 A1 | 6/2005 | Fein et al. | |
| 2005/0143077 A1 | 6/2005 | Charbonneau | |
| 2005/0143091 A1 | 6/2005 | Shapira et al. ............. 455/456.1 |
| 2005/0147067 A1 | 7/2005 | Mani et al. | |
| 2005/0147071 A1 | 7/2005 | Karaoguz et al. | |
| 2005/0148306 A1 | 7/2005 | Hiddink | |
| 2005/0153712 A1 | 7/2005 | Osaka et al. ............... 455/456.5 |
| 2005/0159108 A1 | 7/2005 | Fletcher | |
| 2005/0174236 A1 | 8/2005 | Brookner | |
| 2005/0176458 A1 | 8/2005 | Shklarsky et al. | |
| 2005/0201323 A1 | 9/2005 | Mani et al. | |
| 2005/0201761 A1 | 9/2005 | Bartur et al. | |
| 2005/0219050 A1 | 10/2005 | Martin | |
| 2005/0224585 A1 | 10/2005 | Durrant et al. | |
| 2005/0226625 A1 | 10/2005 | Wake et al. | |
| 2005/0232636 A1 | 10/2005 | Durrant et al. | |
| 2005/0242188 A1 | 11/2005 | Vesuna | |

(56) References Cited

U.S. PATENT DOCUMENTS

| | | |
|---|---|---|
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin et al. ............... 455/456.1 |
| 2006/0017633 A1 | 1/2006 | Pronkine |
| 2006/0025158 A1 | 2/2006 | Leblanc et al. ............ 455/456.2 |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0209752 A1 | 9/2006 | Wijngaarden et al. ........ 370/328 |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2006/0276202 A1 | 12/2006 | Moeglein et al. .......... 455/456.1 |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0104128 A1 | 5/2007 | Laroia et al. ................. 370/329 |
| 2007/0104164 A1 | 5/2007 | Laroia et al. ................. 370/338 |
| 2007/0140168 A1 | 6/2007 | Laroia et al. ................. 370/330 |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0202844 A1 | 8/2007 | Wilson et al. .............. 455/404.2 |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253355 A1 | 11/2007 | Hande et al. ................. 371/328 |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0268853 A1 | 11/2007 | Ma et al. ...................... 370/328 |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0077326 A1 | 3/2008 | Funk et al. ................... 701/220 |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0119208 A1 | 5/2008 | Flanagan et al. ........... 455/456.6 |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159744 A1 | 7/2008 | Soto et al. |
| 2008/0166094 A1 | 7/2008 | Bookbinder et al. |
| 2008/0167049 A1 | 7/2008 | Karr et al. ................... 455/456.2 |
| 2008/0191682 A1 | 8/2008 | Cook |
| 2008/0194226 A1 | 8/2008 | Rivas et al. ................. 455/404.2 |
| 2008/0201226 A1 | 8/2008 | Carlson et al. .................. 705/14 |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0270522 A1 | 10/2008 | Souissi ......................... 709/203 |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073885 A1 | 3/2009 | Jalil et al. ..................... 370/241 |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0163224 A1 | 6/2009 | Dean et al. .................. 455/456.1 |
| 2009/0169163 A1 | 7/2009 | Abbott, III et al. |
| 2009/0175214 A1 | 7/2009 | Sfar et al. |
| 2009/0176507 A1 | 7/2009 | Wu et al. .................... 455/456.2 |
| 2009/0180407 A1 | 7/2009 | Sabat et al. |
| 2009/0180426 A1 | 7/2009 | Sabat et al. |
| 2009/0191891 A1 | 7/2009 | Ma et al. .................... 455/456.1 |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |

(56) References Cited

U.S. PATENT DOCUMENTS

| | | |
|---|---|---|
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0007485 A1 | 1/2010 | Kodrin et al. ............ 340/539.13 |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0121567 A1 | 5/2010 | Mendelson ................ 701/206 |
| 2010/0127937 A1 | 5/2010 | Chandrasekaran et al. |
| 2010/0128568 A1 | 5/2010 | Han et al. ........................ 367/99 |
| 2010/0130233 A1 | 5/2010 | Parker ......................... 455/456.3 |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0151821 A1 | 6/2010 | Sweeney et al. ............. 455/410 |
| 2010/0156721 A1 | 6/2010 | Alamouti et al. |
| 2010/0159859 A1 | 6/2010 | Rofougaran |
| 2010/0178936 A1 | 7/2010 | Wala et al. .................. 455/456.2 |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0234045 A1 | 9/2010 | Karr et al. ................... 455/456.1 |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0273504 A1 | 10/2010 | Bull et al. ................... 455/456.1 |
| 2010/0278530 A1 | 11/2010 | Kummetz et al. |
| 2010/0284323 A1 | 11/2010 | Tang et al. |
| 2010/0287011 A1 | 11/2010 | Muchkaev ........................ 705/7 |
| 2010/0290355 A1 | 11/2010 | Roy et al. |
| 2010/0291949 A1 | 11/2010 | Shapira et al. .............. 455/456.1 |
| 2010/0309049 A1 | 12/2010 | Reunamäki et al. |
| 2010/0309752 A1 | 12/2010 | Lee et al. ........................ 367/99 |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. ................... 398/58 |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0028157 A1 | 2/2011 | Larsen ....................... 455/456.1 |
| 2011/0028161 A1 | 2/2011 | Larsen ....................... 455/456.1 |
| 2011/0035284 A1 | 2/2011 | Moshfeghi ................. 705/14.58 |
| 2011/0045767 A1 | 2/2011 | Rofougaran et al. |
| 2011/0050501 A1 | 3/2011 | Aljadeff ......................... 342/387 |
| 2011/0055875 A1 | 3/2011 | Zussman |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. ............. 455/411 |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0124347 A1 | 5/2011 | Chen et al. .................. 455/456.1 |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0159876 A1 | 6/2011 | Segall et al. ..................... 45/442 |
| 2011/0159891 A1 | 6/2011 | Segall et al. ................ 455/456.3 |
| 2011/0171912 A1 | 7/2011 | Beck et al. .................. 455/67.11 |
| 2011/0171946 A1 | 7/2011 | Soehren ........................ 455/418 |
| 2011/0171973 A1 | 7/2011 | Beck et al. .................. 455/456.2 |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0210843 A1 | 9/2011 | Kummetz ...................... 340/517 |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. ............. 455/456.2 |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0279445 A1 | 11/2011 | Murphy et al. ................ 345/419 |
| 2011/0281536 A1 | 11/2011 | Lee et al. |
| 2011/0312340 A1 | 12/2011 | Wu et al. .................... 455/456.1 |
| 2012/0028649 A1 | 2/2012 | Gupta et al. ................ 455/456.1 |
| 2012/0039320 A1 | 2/2012 | Lemson et al. ................ 370/338 |
| 2012/0046049 A1 | 2/2012 | Curtis et al. ................ 455/456.3 |
| 2012/0058775 A1 | 3/2012 | Dupray et al. .............. 455/456.1 |
| 2012/0069880 A1 | 3/2012 | Lemson et al. |
| 2012/0072106 A1 | 3/2012 | Han et al. ........................ 701/410 |
| 2012/0081248 A1 | 4/2012 | Kennedy et al. ............... 342/118 |
| 2012/0084177 A1 | 4/2012 | Tanaka et al. ................ 705/26.41 |
| 2012/0087212 A1 | 4/2012 | Vartanian et al. .............. 367/118 |
| 2012/0095779 A1 | 4/2012 | Wengrovitz et al. ............... 705/3 |
| 2012/0108258 A1 | 5/2012 | Li ................................ 455/456.1 |
| 2012/0130632 A1 | 5/2012 | Bandyopadhyay et al. .. 701/446 |
| 2012/0135755 A1 | 5/2012 | Lee et al. .................... 455/456.2 |
| 2012/0158297 A1 | 6/2012 | Kim et al. ...................... 701/516 |
| 2012/0158509 A1 | 6/2012 | Zivkovic et al. ............ 705/14.58 |
| 2012/0177026 A1 | 7/2012 | Uyehara et al. |
| 2012/0179548 A1 | 7/2012 | Sun et al. .................... 705/14.58 |
| 2012/0179549 A1 | 7/2012 | Sigmund et al. ............ 705/14.58 |
| 2012/0179561 A1 | 7/2012 | Sun et al. ....................... 705/26.3 |
| 2012/0196626 A1 | 8/2012 | Fano et al. ................... 455/456.3 |
| 2012/0215438 A1 | 8/2012 | Liu et al. ........................ 701/409 |
| 2012/0221392 A1 | 8/2012 | Baker et al. ................ 705/14.17 |
| 2012/0232917 A1 | 9/2012 | Al-Khudairy et al. ............. 705/2 |
| 2012/0243469 A1 | 9/2012 | Klein ............................ 370/328 |
| 2012/0303446 A1 | 11/2012 | Busch ........................ 705/14.45 |
| 2012/0303455 A1 | 11/2012 | Busch ........................ 705/14.57 |
| 2012/0310836 A1 | 12/2012 | Eden et al. ...................... 705/44 |
| 2013/0006663 A1 | 1/2013 | Bertha et al. ...................... 705/3 |
| 2013/0006849 A1 | 1/2013 | Morris ............................ 705/39 |
| 2013/0012195 A1 | 1/2013 | Sabat, Jr. et al. |
| 2013/0036012 A1 | 2/2013 | Lin et al. ..................... 705/14.58 |
| 2013/0040654 A1 | 2/2013 | Parish ......................... 455/456.1 |
| 2013/0045758 A1 | 2/2013 | Khorashadi et al. ........ 455/456.3 |
| 2013/0046691 A1 | 2/2013 | Culton ............................ 705/44 |
| 2013/0066821 A1 | 3/2013 | Moore et al. .................... 706/45 |
| 2013/0073336 A1 | 3/2013 | Heath .......................... 705/7.29 |
| 2013/0073377 A1 | 3/2013 | Heath ........................ 705/14.39 |
| 2013/0073388 A1 | 3/2013 | Heath ........................ 705/14.53 |
| 2013/0073422 A1 | 3/2013 | Moore et al. ................. 705/26.7 |
| 2013/0080578 A1 | 3/2013 | Murad et al. ................... 709/217 |
| 2013/0084859 A1 | 4/2013 | Azar ........................... 455/435.1 |
| 2013/0089332 A1 | 4/2013 | Sauer et al. |
| 2013/0210490 A1 | 8/2013 | Fischer et al. |

(56) References Cited

U.S. PATENT DOCUMENTS

| | | | |
|---|---|---|---|
| 2013/0322415 A1 | 12/2013 | Chamarti et al. | 370/338 |
| 2014/0016583 A1 | 1/2014 | Smith | |
| 2014/0072064 A1 | 3/2014 | Lemson et al. | |
| 2014/0140225 A1 | 5/2014 | Wala | |
| 2014/0146797 A1 | 5/2014 | Zavadsky et al. | |
| 2014/0146905 A1 | 5/2014 | Zavadsky et al. | |
| 2014/0146906 A1 | 5/2014 | Zavadsky et al. | |
| 2014/0219140 A1 | 8/2014 | Uyehara et al. | |
| 2014/0323150 A1 | 10/2014 | Mangold et al. | 455/456.1 |

FOREIGN PATENT DOCUMENTS

| | | |
|---|---|---|
| AU | 2010100320 A4 | 6/2010 |
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |
| EP | 1037411 A2 | 9/2000 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| JP | 2009288245 | 12/2009 |
| KR | 20010055088 A | 7/2001 |
| WO | 9603823 A1 | 2/1996 |
| WO | 9810600 A1 | 3/1998 |
| WO | 00042721 A1 | 7/2000 |
| WO | 0072475 A1 | 11/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | WO2008/099383 A2 | 8/2008 |
| WO | WO2008/099390 A3 | 8/2008 |
| WO | 2008116014 A2 | 9/2008 |
| WO | 2006046088 A1 | 5/2009 |
| WO | WO2009/081376 A3 | 7/2009 |
| WO | WO2009/097237 A1 | 8/2009 |
| WO | 2010090999 A1 | 8/2010 |
| WO | 2010132739 A1 | 11/2010 |
| WO | WO2011/017700 A1 | 2/2011 |
| WO | 2011023592 A1 | 3/2011 |
| WO | 2011100095 A1 | 8/2011 |
| WO | WO2011/091859 A1 | 8/2011 |
| WO | WO2011/123336 A1 | 10/2011 |
| WO | 2011139939 A1 | 11/2011 |
| WO | 2012148938 A1 | 11/2012 |
| WO | 2012148940 A1 | 11/2012 |
| WO | 2013122915 A1 | 8/2013 |

OTHER PUBLICATIONS

Kim, et al, "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.

"Cellular Specialties Introduces the First Simulcasted In-building Location-Based Tracking Solution," http://smart-grid.tmcnet.com/news/2009/09/14/4368300.htm, 2 pages.

Gansemer, et al., "RSSI-based Euclidean Distance Algorithm for Indoor Positioning Adapted for use in dynamically changing WLAN environments and multi-level buildings," 2010 International Conference on Indoor Positioning and Indoor Navigation(IPIN), Sep. 15-17, 2010, 6 pages.

Patent Cooperation Treaty, International Search Report for PCT/US2013/043107, Sep. 9, 2013, 5 pages.

(56) References Cited

OTHER PUBLICATIONS

Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Notice of Reexamination for Chinese patent application 20078002293.6 mailed Nov. 28, 2014, 22 pages.
Non-final Office Action for U.S. Appl. No. 13/688,448 mailed Dec. 29, 2014, 16 pages.
Non-final Office Action for U.S. Appl. No. 14/063,245 mailed Jan. 26, 2015, 22 pages.
Examination Report for European patent application 10702806.0 mailed Nov. 14, 2014, 7 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Second Office Action for Chinese patent application 20078002293.6 mailed Aug. 30, 2012, 10 pages.
International Search Report for PCT/US2010/022847 mailed Jul. 12, 2010, 3 pages.
International Search Report for PCT/US2010/022857 mailed Jun. 18, 2010, 3 pages.
Decision on Appeal for U.S. Appl. No. 11/451,237 mailed Mar. 19, 2013, 7 pages.
Decision on Rejection for Chinese patent application 200780022093.6 mailed Feb. 5, 2013, 9 pages.
International Search Report and Written Opinion for International patent application PCT/US2007/013802 mailed May 8, 2008, 12 pages.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order

(56) References Cited

OTHER PUBLICATIONS

Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Advisory Action for U.S. Appl. No. 12/712,758 mailed Sep. 16, 2013, 3 pages.
Final Office Action for U.S. Appl. No. 12/712,758 mailed May 24, 2013, 17 pages.
Non-final Office Action for U.S. Appl. No. 12/712,758 mailed Jan. 10, 2012, 14 pages.
Examination Report for European patent application 07835803.3 mailed Aug. 13, 2013, 6 pages.
Extended European Search Report for patent application 10014262.9 mailed Mar. 14, 2011, 6 pages.
International Search Report and Written Opinion for PCT/US2012/034853 mailed Aug. 6, 2012, 12 pages.
International Search Report and Written Opinion for PCT/US2012/034855 mailed Jul. 26, 2012, 10 pages.
Written Opinion of the International Searching Authority for European patent application 11701916.6 mailed Sep. 21, 2012, 10 pages.
International Search Report for PCT/US2011/021799 mailed Apr. 6, 2011, 4 pages.
Examination Report for European patent application 10702806.0 mailed Sep. 12, 2013, 11 pages.
Non-final Office Action for U.S. Appl. No. 13/194,429 mailed Mar. 1, 2013, 22 pages.
Notice of Allowance for U.S. Appl. No. 13/194,429 mailed Jul. 9, 2013, 9 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report for PCT/US2011/034733 mailed Aug. 1, 2011, 5 pages.
International Preliminary Report on Patentability for PCT/US2011/034733 mailed Nov. 6, 2012, 7 pages.
Examiner's Answer to the Appeal Brief for U.S. Appl. No. 12/712,758, mailed Jul. 7, 2014, 12 pages.
Notice of Allowance for U.S. Appl. No. 13/592,502, mailed May 9, 2014, 9 pages.
Author Unknown, "VCSEL Chaotic Synchronization and Modulation Characteristics," Master's Thesis, Southwest Jiatong University, Professor Pan Wei, Apr. 2006, 8 pages (machine translation).
Translation of the First Office Action for Chinese Patent Application No. 201180008168.1, mailed Jun. 5, 2014, 9 pages.
Notification of First Office Action for Chinese Patent Application No. 201010557770.8, mailed Jul. 3, 2014, 14 pages.
Non-final Office Action for U.S. Appl. No. 12/618,613 mailed Dec. 29, 2011, 10 pages.
Non-final Office Action for U.S. Appl. No. 12/618,613 mailed Jul. 5, 2012, 9 pages.
Translation of the First Office Action for Chinese Patent Application No. 201080055264.7, mailed Jun. 5, 2014, 6 pages.
Extended European Search Report for European patent application 12777604.5 mailed Oct. 1, 2014, 7 pages.
Extended European Search Report for European patent application 12776915.6 mailed Oct. 13, 2014, 7 pages.
Decision on Appeal for U.S. Appl. No. 11/406,976, mailed Nov. 3, 2014, 6 pages.
Non-final Office Action for U.S. Appl. No. 14/063,630 mailed Jul. 10, 2015, 19 pages.
Non-final Office Action for U.S. Appl. No. 14/465,565 mailed Jun. 26, 2015, 15 pages.

\* cited by examiner

DETERMINING PROPAGATION DELAY OF COMMUNICATIONS IN DISTRIBUTED ANTENNA SYSTEMS, AND RELATED COMPONENTS, SYSTEMS, AND METHODS

PRIORITY CLAIMS

This application claims the benefit of priority under 35 U.S.C. §365 of International Patent Application Serial No. PCT/US12/34853 filed on Apr. 25, 2012 designating the United States of America the content of which is relied upon and incorporated herein by reference in its entirety.

This application also claims the benefit of priority under 35 U.S.C. §119 of U.S. Provisional Patent Application Ser. No. 61/480,700 filed on Apr. 29, 2011, the content of which is relied upon and incorporated herein by reference in its entirety.

RELATED APPLICATIONS

The present application is also related to U.S. patent application Ser. No. 12/914,585 filed on Oct. 28, 2010, entitled "SECTORIZATION IN DISTRIBUTED ANTENNA SYSTEMS, AND RELATED COMPONENTS AND METHODS," which is incorporated herein by reference in its entirety.

BACKGROUND

1. Field of the Disclosure

The technology of the disclosure relates to determining propagation delay in distributed radio frequency (RF) communications signals communicated over optical fiber in distributed antenna systems.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed antenna systems communicate with wireless devices called "clients" (e.g., for WiFi services) or "user equipment" (e.g., for cellular services) which must reside within the wireless range or "cell coverage area" in order to communicate with an access point device.

One approach to deploying a distributed antenna system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed antenna system access to clients within the building or facility. However, it may be desirable to employ optical fiber to distribute communications signals. Benefits of optical fiber include increased bandwidth.

One type of distributed antenna system for creating antenna coverage areas, called "Radio-over-Fiber" or "RoF," utilizes RF signals sent over optical fibers. Such systems can include head-end equipment optically coupled to a plurality of remote antenna units that each provides antenna coverage areas. The remote antenna units can each include RF transceivers coupled to an antenna to transmit RF signals wirelessly, wherein the remote antenna units are coupled to the head-end equipment via optical fiber links. The RF transceivers in the remote antenna units are transparent to the RF signals. The remote antenna units convert incoming optical RF signals from an optical fiber downlink to electrical RF signals via optical-to-electrical (O/E) converters, which are then passed to the RF transceiver. The RF transceiver converts the electrical RF signals to electromagnetic signals via antennas coupled to the RF transceiver provided in the remote antenna units. The antennas also receive electromagnetic signals (i.e., electromagnetic radiation) from clients in the antenna coverage area and convert them to electrical RF signals (i.e., electrical RF signals in wire). The remote antenna units then convert the electrical RF signals to optical RF signals via electrical-to-optical (E/O) converters. The optical RF signals are then sent over an optical fiber uplink to the head-end equipment.

It may be desired to provide such optical fiber-based distributed communications systems indoors, such as inside a building or other facility, to provide indoor wireless communication for clients. Otherwise, wireless reception may be poor or not possible for wireless communication clients located inside the building. In this regard, the remote antenna units can be distributed throughout locations inside a building to extend wireless communication coverage throughout the building. However, other services may be affected. For example, cellular communications protocols may be based on time based protocols. However, distributing cellular communications to remote antenna units inside a building or other environment can increase delay or introduce path dependent variability of observed delays due to the propagation delay of the communications signals being distributed to the remote antenna units and responses received at the remote antenna units being distributed back to head-end equipment. If the delay(s) exceeds a certain level, the bandwidth of the communications system may be reduced. Other undesired effects can also result from delay exceeding certain levels, including interference. As another example, providing localization services for a client, such as emergency 911 (E911) services, may be determined or calculated based on over-the-air delay between communications from a client and a communications tower. However, if the client is communicating over a distributed antenna system, the propagation delay of the distributed antenna system increases the delay thus possibly resulting in an incorrect determination of a location of the client.

Delay can be compensated for in a cellular communications system, but the cellular communications system may be unaware of indoor distributed antenna systems that increase the delay as a result of propagation delay. Also, a cellular communications system may provide for the ability to set a flag or other indicator to indicate that distributed antenna systems are present in coverage areas for communications antennas or towers. However, this setting may only provide for the ability of the cellular communications system to approximate additional propagation delay present which may not be accurate.

SUMMARY OF THE DETAILED DESCRIPTION

Embodiments disclosed in the detailed description include components, systems, and methods for determining propagation delay of communications in distributed antenna systems. The propagation delay of communications signals distributed in the distributed antenna systems is determined If desired, the propagation delay(s) can be determined on a per remote antenna unit basis for the distributed antenna systems. The propagation delay(s) can be provided by the distributed antenna systems to a network or other system to be taken into consideration for communications services or operations that are based on communications signal delay. Delay based operations may be made more effective, efficient, and/or accurate by knowing the propagation delay experienced in a distributed antenna system.

As a non-limiting example, the determined propagation delay(s) can be to be taken into consideration for communications services or operations that are based on communications signal delay. As another non-limiting example, the propagation delay(s) may be associated with communication antennas or towers that are mapped and stored in a database(s) to be used for communications services or operations based on communications signal delay. As another non-limiting example, the arrangement of the base station, repeaters, or communication towers in a network may be repositioned based on the determined propagation delay. As another non-limiting example, propagation delay can be determined and controlled for each remote antenna unit to be uniquely distinguish the remote antenna units. In this manner, the location of a client device communicating with a remote antenna unit can be determined within the communication range of the remote antenna unit.

In this regard, in one embodiment, a distributed antenna system is provided. The system comprises at least one downlink radio frequency (RF) interface configured to receive downlink RF signals and distribute the downlink RF signals over at least one downlink communications medium to one or more remote antenna units (RAUs). This system also comprises at least one uplink RF interface configured to receive uplink RF signals over at least one uplink communications medium from the one or more RAUs. This system also comprises at least one propagation delay measurement circuit communicatively coupled to the at least one downlink RF interface and the at least one uplink RF interface and configured to measure propagation delay between the distribution of the downlink RF signals by the at least one downlink RF interface and the receipt of the downlink RF signals as uplink RF signals by the at least one uplink RF interface. This system also comprises a controller communicatively coupled to the at least one propagation delay measurement circuit. This controller is configured to communicate to an RAU among the one or more RAUs to return received downlink RF signals as uplink RF signals to the at least one uplink RF interface. This controller is also configured to activate the at least one downlink RF interface to distribute the received downlink RF signals to the RAU among the one or more RAUs. This controller is also configured to determine the propagation delay as a function of delay between the at least one downlink RF interface and the RAU among the one or more RAUs, and as a function of delay between the RAU among the one or more RAUs and the at least one uplink RF interface from the at least one propagation delay measurement circuit.

In another embodiment, a method of determining propagation delay in a distributed antenna system is provided. This method includes communicating to a remote antenna unit (RAU) among one or more RAUs to return received downlink radio frequency (RF) signals from at least one downlink RF interface as uplink RF signals to at least one uplink RF interface. The method also includes activating the at least one downlink RF interface to distribute the received downlink RF signals to the RAU among the one or more RAUs. This method also includes distributing the downlink RF signals to the RAU among the one or more RAUs over at least one downlink communications medium. This method also includes receiving the distributed downlink RF signals as the uplink RF signals from the RAU among the one or more RAUs over at least one uplink communications medium. This method also includes determining propagation delay using at least one propagation delay measurement circuit as a function of delay between the at least one downlink RF interface and the RAU among the one or more RAUs, and as a function of delay between the RAU among the one or more RAUs and the at least one uplink RF interface.

As a non-limiting example, the distributed antenna system may be an optical fiber-based distributed antenna system, but such is not required. The embodiments disclosed herein are also applicable to other distributed antenna systems, including those that include other forms of communications media for distribution of communications signals, including electrical conductors and wireless transmission. The embodiments disclosed herein may also be applicable to distributed antenna system may also include more than one communications media for distribution of communications signals.

Additional features and advantages will be set forth in the detailed description which follows, and in part will be readily apparent to those skilled in the art from that description or recognized by practicing the embodiments as described herein, including the detailed description that follows, the claims, as well as the appended drawings.

The drawings illustrate various embodiments, and together with the description serve to explain the principles and operation of the concepts disclosed.

DETAILED DESCRIPTION

Figure 1:
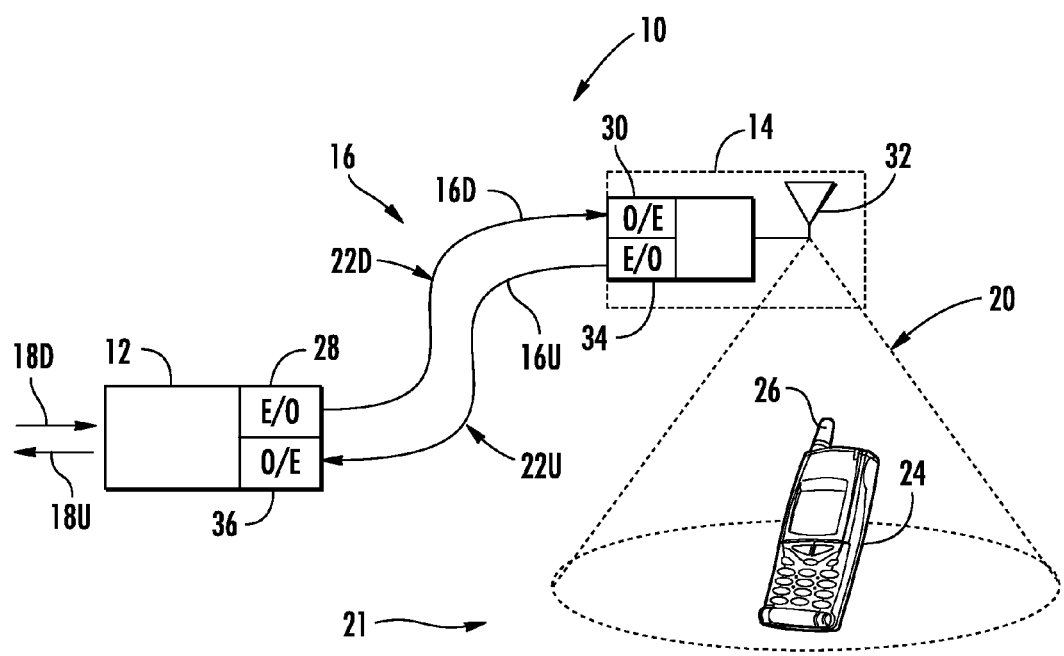
FIG. 1 is a schematic diagram of an exemplary optical fiber-based distributed antenna system.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include components, systems, and methods for determining propagation delay of communications in distributed antenna systems. The propagation delay of communications signals distributed in the distributed antenna systems is determined If desired, the propagation delay(s) can be determined on a per remote antenna unit basis for the distributed antenna systems. The propagation delay(s) can be provided by the distributed antenna systems to a network or other system to be taken into consideration for communications services or operations that are based on communications signal delay. Delay based operations may be made more effective, efficient, and/or accurate by knowing the propagation delay experienced in a distributed antenna system.

As a non-limiting example, the determined propagation delay(s) can be to be taken into consideration for communications services or operations that are based on communications signal delay. As another non-limiting example, the propagation delay(s) may be associated with communication antennas or towers that are mapped and stored in a database(s) to be used for communications services or operations based on communications signal delay. As another non-limiting example, the arrangement of the base station, repeaters, or communication towers in a network may be repositioned based on the determined propagation delay. As another non-limiting example, propagation delay can be determined and controlled for each remote antenna unit to be uniquely distinguish the remote antenna units. In this manner, the location of a client device communicating with a remote antenna unit can be determined within the communication range of the remote antenna unit.

Before discussing examples of distributed antenna systems that determine propagation delay of communications signals distributed within the distributed antenna systems, exemplary distributed antenna systems capable of distributing communications signals to distributed or remote antenna units is first described with regard to FIGS. 1-6. Embodiments of determining propagation delay of communications signals distributed in distributed antenna systems starts at FIG. 7. The distributed antenna systems in FIGS. 1-6 discussed below include distribution of radio frequency (RF) communications signals, but the distributed antenna systems are not limited to distribution of RF communications signals. Further, the distributed antenna systems in FIGS. 1-6 discussed below include distribution of communications signals over optical fiber, but the distributed antenna systems are not limited to distribution over optical fiber.

In this regard, FIG. 1 is a schematic diagram of an embodiment of a distributed antenna system. In this embodiment, the system is an optical fiber-based distributed antenna system 10. The optical fiber-based distributed antenna system 10 is configured to create one or more antenna coverage areas for establishing communications with wireless client devices located in the RF range of the antenna coverage areas. The optical fiber-based distributed antenna system 10 provides RF communication services (e.g., cellular services). In this embodiment, the optical fiber-based distributed antenna system 10 includes head-end equipment (HEE) 12 such as a head-end unit (HEU), one or more remote antenna units (RAUs) 14, and an optical fiber 16 that optically couples the HEE 12 to the RAU 14. The RAU 14 is a type of remote communications unit. In general, a remote communications unit can support wireless communications, wired communications, or both. The RAU 14 can support wireless communications and may also support wired communications. The HEE 12 is configured to receive communications over downlink electrical RF signals 18D from a source or sources, such as a network or carrier as examples, and provide such communications to the RAU 14. The HEE 12 is also configured to return communications received from the RAU 14, via uplink electrical RF signals 18U, back to the source or sources. In this regard in this embodiment, the optical fiber 16 includes at least one downlink optical fiber 16D to carry signals communicated from the HEE 12 to the RAU 14 and at least one uplink optical fiber 16U to carry signals communicated from the RAU 14 back to the HEE 12.

One downlink optical fiber 16D and one uplink optical fiber 16U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are disclosed in U.S. patent application Ser. No. 12/892,424, any of which can be employed in any of the embodiments disclosed herein. Further, U.S. patent application Ser. No. 12/892,424 also discloses distributed digital data communications signals in a distributed antenna system which may also be distributed in the optical fiber-based distributed antenna system 10 either in conjunction with RF communications signals or not.

The optical fiber-based distributed antenna system 10 has an antenna coverage area 20 that can be disposed about the RAU 14. The antenna coverage area 20 of the RAU 14 forms an RF coverage area 21. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the HEE 12 includes an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the HEE 12 converts the uplink optical RF signals 22U into uplink electrical RF signals, which can then be communicated as uplink electrical RF signals 18U back to a network or other source. The HEE 12 in this embodiment is not able to distinguish the location of the client devices 24 in this embodiment. The client device 24 could be in the range of any antenna coverage area 20 formed by an RAU 14.

Figure 2:
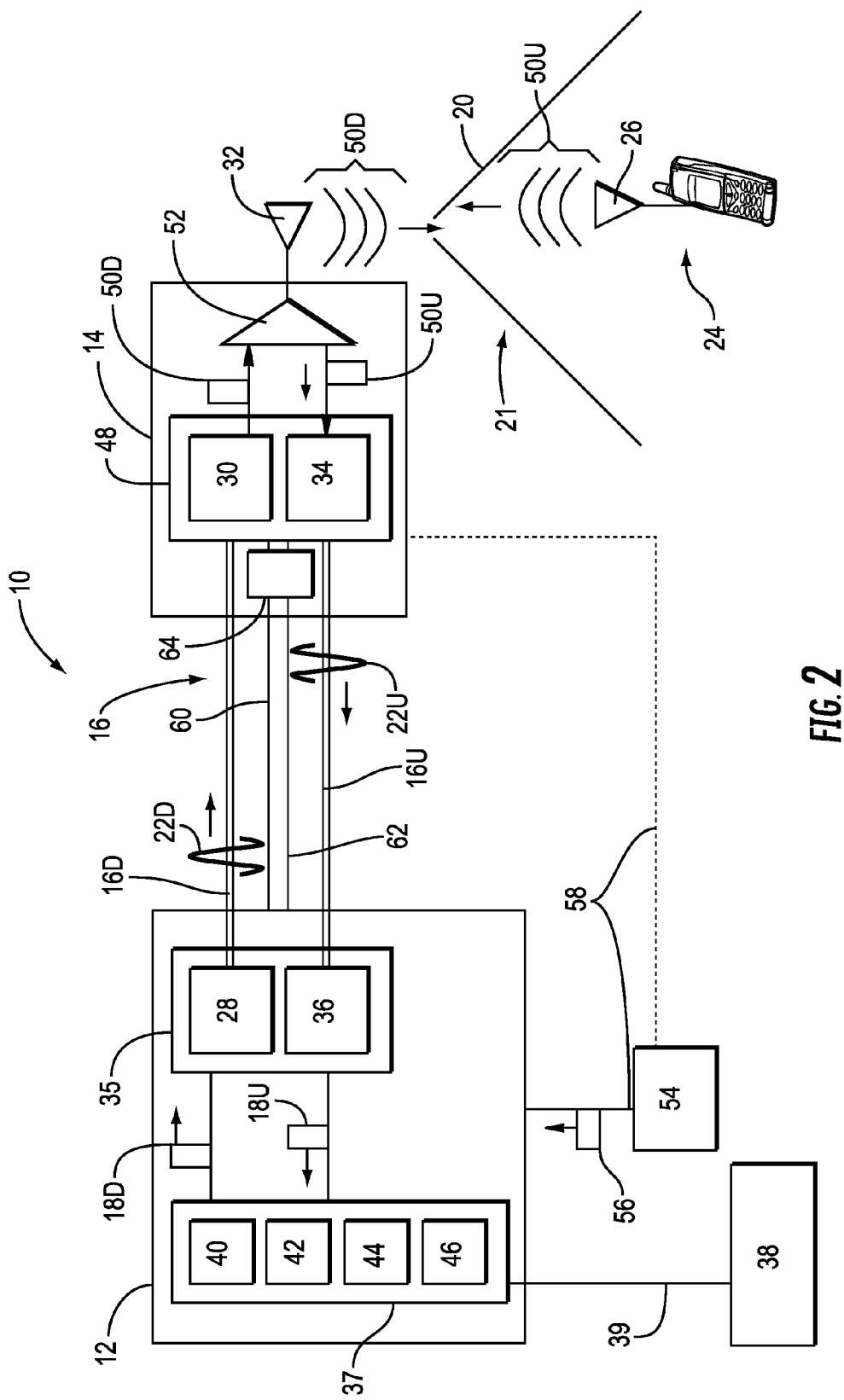
FIG. 2 is a more detailed schematic diagram of exemplary head-end equipment and a remote antenna unit (RAU) that can be deployed in the optical fiber-based distributed antenna system of FIG. 1.

FIG. 2 is a more detailed schematic diagram of the exemplary optical fiber-based distributed antenna system 10 of FIG. 1 that provides electrical RF service signals for a particular RF service or application. In an exemplary embodiment, the HEE 12 includes a service unit 37 that provides electrical RF service signals by passing (or conditioning and then passing) such signals from one or more outside networks 38 via a network link 39. In a particular example embodiment, this includes providing cellular signal distribution in the frequency range from 400 MegaHertz (MHz) to 2.7 GigaHertz (GHz). Any other electrical RF signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E/O converter 28 that receives the downlink electrical RF signals 18D from the service unit 37 and converts them to corresponding downlink optical RF signals 22D. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEE 12 also includes the O/E converter 36, which is electrically coupled to the service unit 37. The O/E converter 36 receives the uplink optical RF signals 22U and converts them to corresponding uplink electrical RF signals 18U. In an example embodiment, the O/E converter 36 is a photodetector, or a photodetector electrically coupled to a linear amplifier. The E/O converter 28 and the O/E converter 36 constitute a "converter pair" 35, as illustrated in FIG. 2.

In accordance with an exemplary embodiment, the service unit 37 in the HEE 12 can include an RF signal conditioner unit 40 for conditioning the downlink electrical RF signals 18D and the uplink electrical RF signals 18U, respectively. The service unit 37 can include a digital signal processing unit ("digital signal processor") 42 for providing to the RF signal conditioner unit 40 an electrical signal that is modulated onto an RF carrier to generate a desired downlink electrical RF signal 18D. The digital signal processor 42 is also configured to process a demodulation signal provided by the demodulation of the uplink electrical RF signal 18U by the RF signal conditioner unit 40. The HEE 12 can also include an optional central processing unit (CPU) 44 for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the O/E converter 30 and the E/O converter 34. The O/E converter 30 converts the received downlink optical RF signals 22D from the HEE 12 back into downlink electrical RF signals 50D. The E/O converter 34 converts uplink electrical RF signals 50U received from the client device 24 into the uplink optical RF signals 22U to be communicated to the HEE 12. The O/E converter 30 and the E/O converter 34 are electrically coupled to the antenna 32 via an RF signal-directing element 52, such as a circulator for example. The RF signal-directing element 52 serves to direct the downlink electrical RF signals 50D and the uplink electrical RF signals 50U, as discussed below. In accordance with an exemplary embodiment, the antenna 32 can include any type of antenna, including but not limited to one or more patch antennas, such as disclosed in U.S. patent application Ser. No. 11/504,999, filed Aug. 16, 2006 entitled "Radio-over-Fiber Transponder With A Dual-Band Patch Antenna System," and U.S. patent application Ser. No. 11/451,553, filed Jun. 12, 2006 entitled "Centralized Optical Fiber-Based Wireless Picocellular Systems and Methods," both of which are incorporated herein by reference in their entireties.

With continuing reference to FIG. 2, the optical fiber-based distributed antenna system 10 also includes a power supply 54 that provides an electrical power signal 56. The power supply 54 is electrically coupled to the HEE 12 for powering the power-consuming elements therein. In an exemplary embodiment, an electrical power line 58 runs through the HEE 12 and over to the RAU 14 to power the O/E converter 30 and the E/O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a single voltage and are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power supply 54 to the RAU 14 rather than from or through the HEE 12. In another example embodiment, the electrical power line 58 includes more than two wires and may carry multiple voltages.

Figure 3:
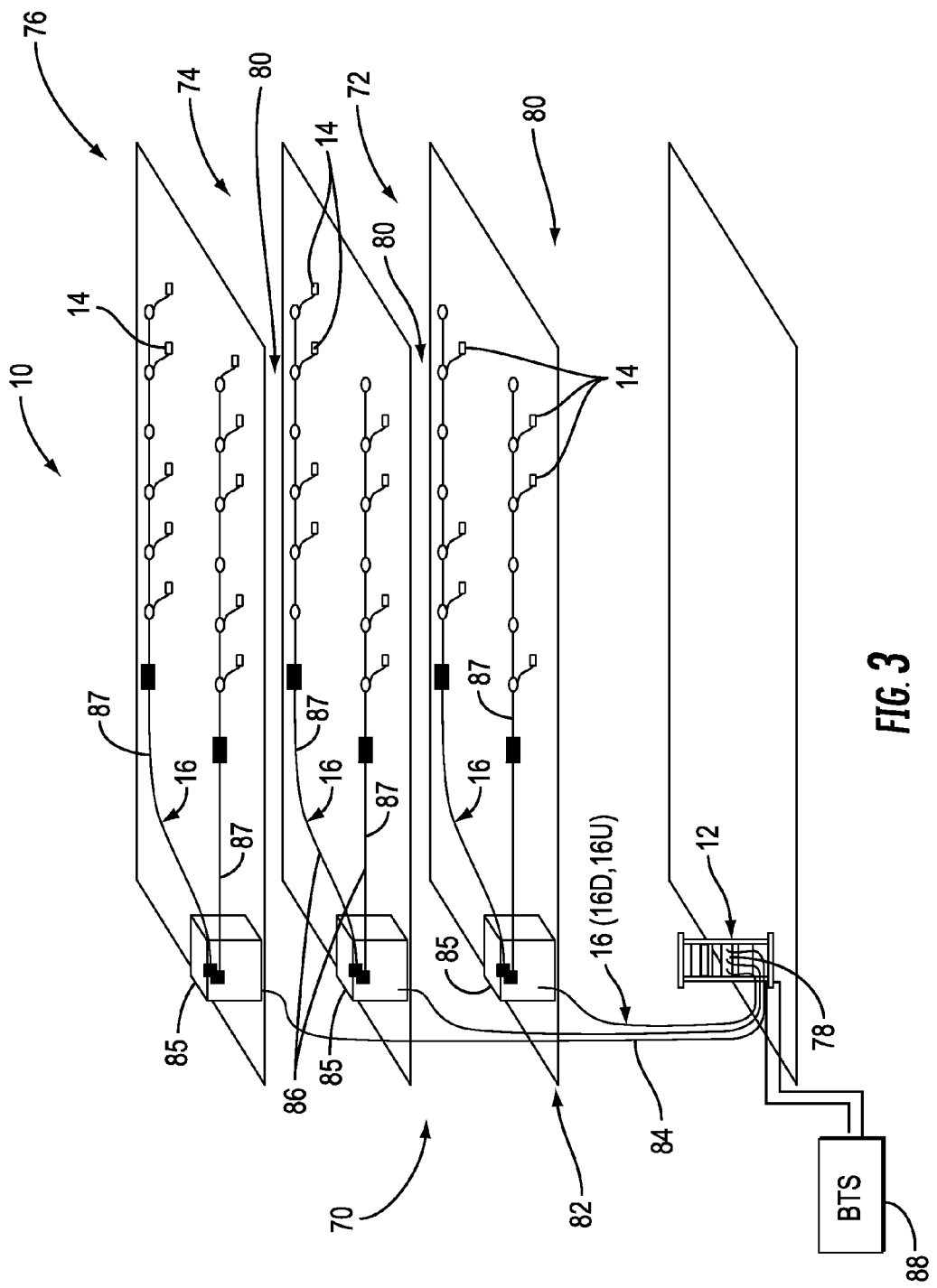
FIG. 3 is a partially schematic cut-away diagram of an exemplary building infrastructure in which the optical fiber-based distributed antenna system in FIG. 1 can be employed.

To provide further exemplary illustration of how an optical fiber-based distributed antenna system can be deployed indoors, FIG. 3 is provided. FIG. 3 is a partially schematic cut-away diagram of a building infrastructure 70 employing an optical fiber-based distributed antenna system. The system may be the optical fiber-based distributed antenna system 10 of FIGS. 1 and 2. The building infrastructure 70 generally represents any type of building in which the optical fiber-based distributed antenna system 10 can be deployed. As previously discussed with regard to FIGS. 1 and 2, the optical fiber-based distributed antenna system 10 incorporates the HEE 12 to provide various types of communication services to coverage areas within the building infrastructure 70, as an example. For example, as discussed in more detail below, the optical fiber-based distributed antenna system 10 in this embodiment is configured to receive wireless RF signals and convert the RF signals into RoF signals to be communicated over the optical fiber 16 to multiple RAUs 14. The optical fiber-based distributed antenna system 10 in this embodiment can be, for example, an indoor distributed antenna system (IDAS) to provide wireless service inside the building infrastructure 70. These wireless signals can include cellular service, wireless services such as RFID tracking, Wireless Fidelity (WiFi), local area network (LAN), WLAN, public safety, wireless building automations, and combinations thereof, as examples.

With continuing reference to FIG. 3, the building infrastructure 70 in this embodiment includes a first (ground) floor 72, a second floor 74, and a third floor 76. The floors 72, 74, 76 are serviced by the HEE 12 through a main distribution frame 78 to provide antenna coverage areas 80 in the building infrastructure 70. Only the ceilings of the floors 72, 74, 76 are shown in FIG. 3 for simplicity of illustration. In the example embodiment, a main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEE 12. The riser cable 84 may be routed through an interconnect unit (ICU) 85. The ICU 85 may be provided as part of or separate from the power supply 54 in FIG. 2. The ICU 85 may also be configured to provide power to the RAUs 14 via the electrical power line 58, as illustrated in FIG. 2 and discussed above, provided inside an array cable 87, or tail cable or home-run tether cable as other examples, and distributed with the downlink and uplink optical fibers 16D, 16U to the RAUs 14. The main cable 82 can include one or more multi-cable (MC) connectors adapted to connect select downlink and uplink optical fibers 16D, 16U, along with an electrical power line, to a number of optical fiber cables 86.

The main cable 82 enables multiple optical fiber cables 86 to be distributed throughout the building infrastructure 70 (e.g., fixed to the ceilings or other support surfaces of each floor 72, 74, 76) to provide the antenna coverage areas 80 for the first, second, and third floors 72, 74, and 76. In an example embodiment, the HEE 12 is located within the building infrastructure 70 (e.g., in a closet or control room), while in another example embodiment, the HEE 12 may be located outside of the building infrastructure 70 at a remote location. A base transceiver station (BTS) 88, which may be provided by a second party such as a cellular service provider, is connected to the HEE 12, and can be co-located or located remotely from the HEE 12. A BTS is any station or signal source that provides an input signal to the HEE 12 and can receive a return signal from the HEE 12. In a typical cellular system, for example, a plurality of BTSs are deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell or femtocell as other examples.

The optical fiber-based distributed antenna system 10 in FIGS. 1-3 and described above provides point-to-point communications between the HEE 12 and the RAU 14. A multipoint architecture is also possible as well. With regard to FIGS. 1-3, each RAU 14 communicates with the HEE 12 over a distinct downlink and uplink optical fiber pair to provide the point-to-point communications. Whenever an RAU 14 is installed in the optical fiber-based distributed antenna system 10, the RAU 14 is connected to a distinct downlink and uplink optical fiber pair connected to the HEE 12. The downlink and uplink optical fibers 16D, 16U may be provided in a fiber optic cable. Multiple downlink and uplink optical fiber pairs can be provided in a fiber optic cable to service multiple RAUs 14 from a common fiber optic cable. For example, with reference to FIG. 3, RAUs 14 installed on a given floor 72, 74, or 76 may be serviced from the same optical fiber 16. In this regard, the optical fiber 16 may have multiple nodes where distinct downlink and uplink optical fiber pairs can be connected to a given RAU 14. One downlink optical fiber 16D could be provided to support multiple channels each using wavelength-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

The HEE 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

Figure 4:
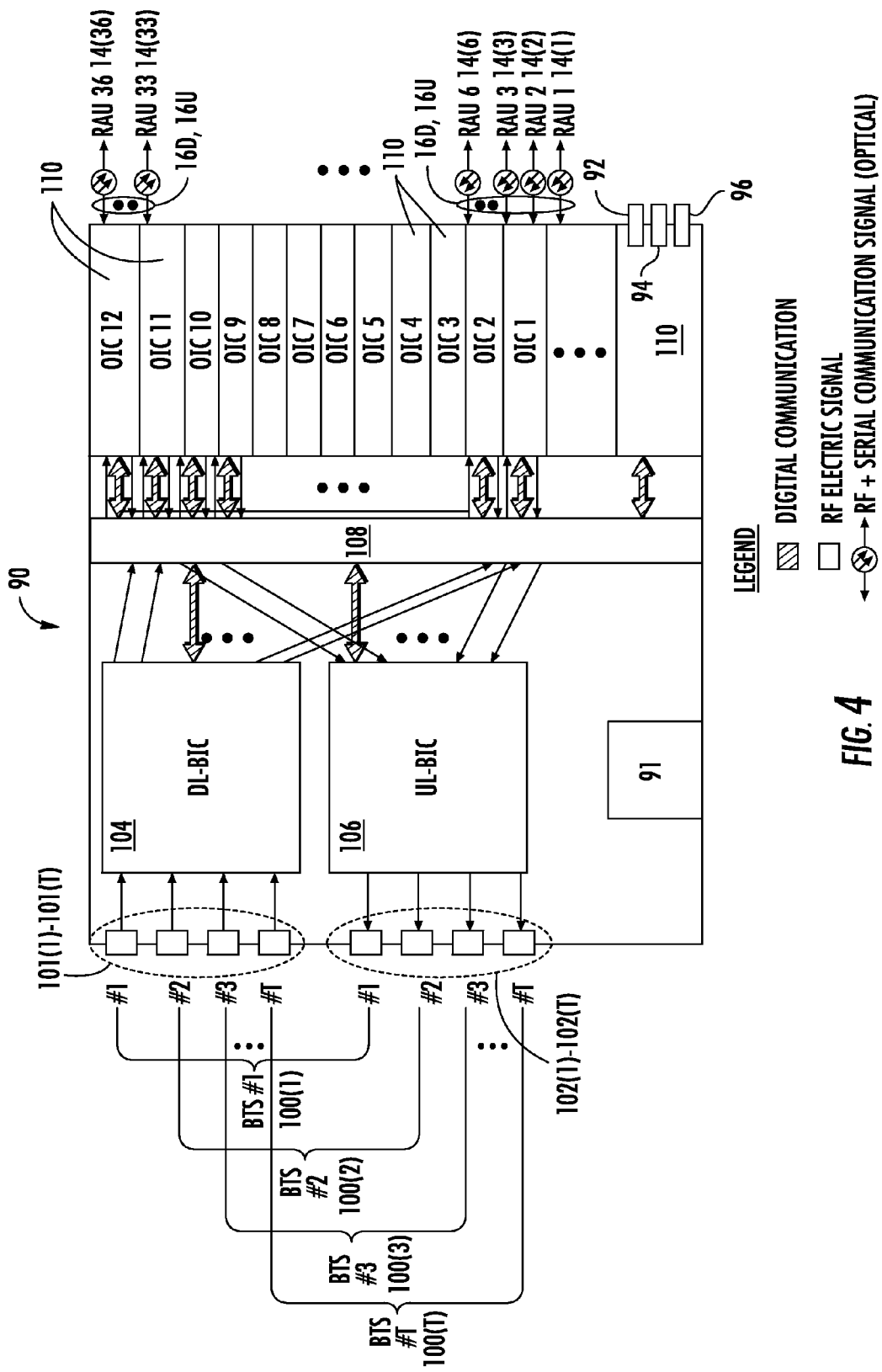
FIG. 4 is a schematic diagram of exemplary head-end equipment to provide radio frequency (RF) communication services over optical fiber to RAUs or other remote communications devices in an optical fiber-based distributed antenna system.

FIG. 4 is a schematic diagram of exemplary HEE 90 that may be employed with any of the distributed antenna systems disclosed herein, including but not limited to the optical fiber-based distributed antenna system 10 in FIGS. 1-3. The HEE 90 in this embodiment is configured to distribute RF communication services over optical fiber. In this embodiment as illustrated in FIG. 4, the HEE 90 includes a head-end controller (HEC) 91 that manages the functions of the HEE 90 components and communicates with external devices via interfaces, such as an RS-232 port 92, a Universal Serial Bus (USB) port 94, and an Ethernet port 96, as examples. The HEE 90 can be connected to a plurality of BTSs, transceivers 100(1)-100(T), and the like via BTS inputs 101(1)-101(T) and BTS outputs 102(1)-102(T). The notation "1-T" indicates that any number of BTS transceivers can be provided up to T number with corresponding BTS inputs and BTS outputs. The BTS inputs 101(1)-101(T) are downlink connections and the BTS outputs 102(1)-102(T) are uplink connections. Each BTS input 101(1)-101(T) is connected to a downlink interface in the form of a downlink BTS interface card (BIC) 104 in this embodiment, which is located in the HEE 90, and each BTS output 102(1)-102(T) is connected to an uplink BIC 106 also located in the HEE 90. The downlink BIC 104 is configured to receive incoming or downlink RF signals from the BTS inputs 101(1)-101(T) and split the downlink RF signals into copies to be communicated to the RAUs 14, as illustrated in FIG. 2. In this embodiment, thirty-six (36) RAUs 14(1)-14(36) are supported by the HEE 90, but any number of RAUs 14 may be supported by the HEE 90. The uplink BIC 106 is configured to receive the combined outgoing or uplink RF signals from the RAUs 14 and split the uplink RF signals into individual BTS outputs 102(1)-102(T) as a return communication path.

With continuing reference to FIG. 4 the downlink BIC 104 is connected to a midplane interface card 108 in this embodiment. The uplink BIC 106 is also connected to the midplane interface card 108. The downlink BIC 104 and uplink BIC 106 can be provided in printed circuit boards (PCBs) that include connectors that can plug directly into the midplane interface card 108. The midplane interface card 108 is in electrical communication with a plurality of optical interfaces provided in the form of optical interface cards (OICs) 110 in this embodiment, which provide an optical to electrical communication interface and vice versa between the RAUs 14 via the downlink and uplink optical fibers 16D, 16U and the downlink BIC 104 and uplink BIC 106. The OICs 110 include the E/O converter 28 like discussed with regard to FIG. 1 that converts electrical RF signals from the downlink BIC 104 to optical RF signals, which are then communicated over the downlink optical fibers 16D to the RAUs 14 and then to client devices. The OICs 110 also include the O/E converter 36 like in FIG. 1 that converts optical RF signals communicated from the RAUs 14 over the uplink optical fibers 16U to the HEE 90 and then to the BTS outputs 102(1)-102(T).

With continuing reference to FIG. 4, the OICs 110 in this embodiment support up to three (3) RAUs 14 each. The OICs 110 can also be provided in a PCB that includes a connector that can plug directly into the midplane interface card 108 to couple the links in the OICs 110 to the midplane interface card 108. The OICs 110 may consist of one or multiple optical interface modules (OIMs). In this manner, the HEE 90 is scalable to support up to thirty-six (36) RAUs 14 in this embodiment since the HEE 90 can support up to twelve (12) OICs 110. If less than thirty-six (36) RAUs 14 are to be supported by the HEE 90, less than twelve (12) OICs 110 can be included in the HEE 90 and plugged into the midplane interface card 108. One OIC 110 is provided for every three (3) RAUs 14 supported by the HEE 90 in this embodiment. OICs 110 can also be added to the HEE 90 and connected to the midplane interface card 108 if additional RAUs 14 are desired to be supported beyond an initial configuration. With continuing reference to FIG. 4, the HEU 91 can also be provided that is configured to be able to communicate with the downlink BIC 104, the uplink BIC 106, and the OICs 110 to provide various functions, including configurations of amplifiers and attenuators provided therein.

Figure 5:
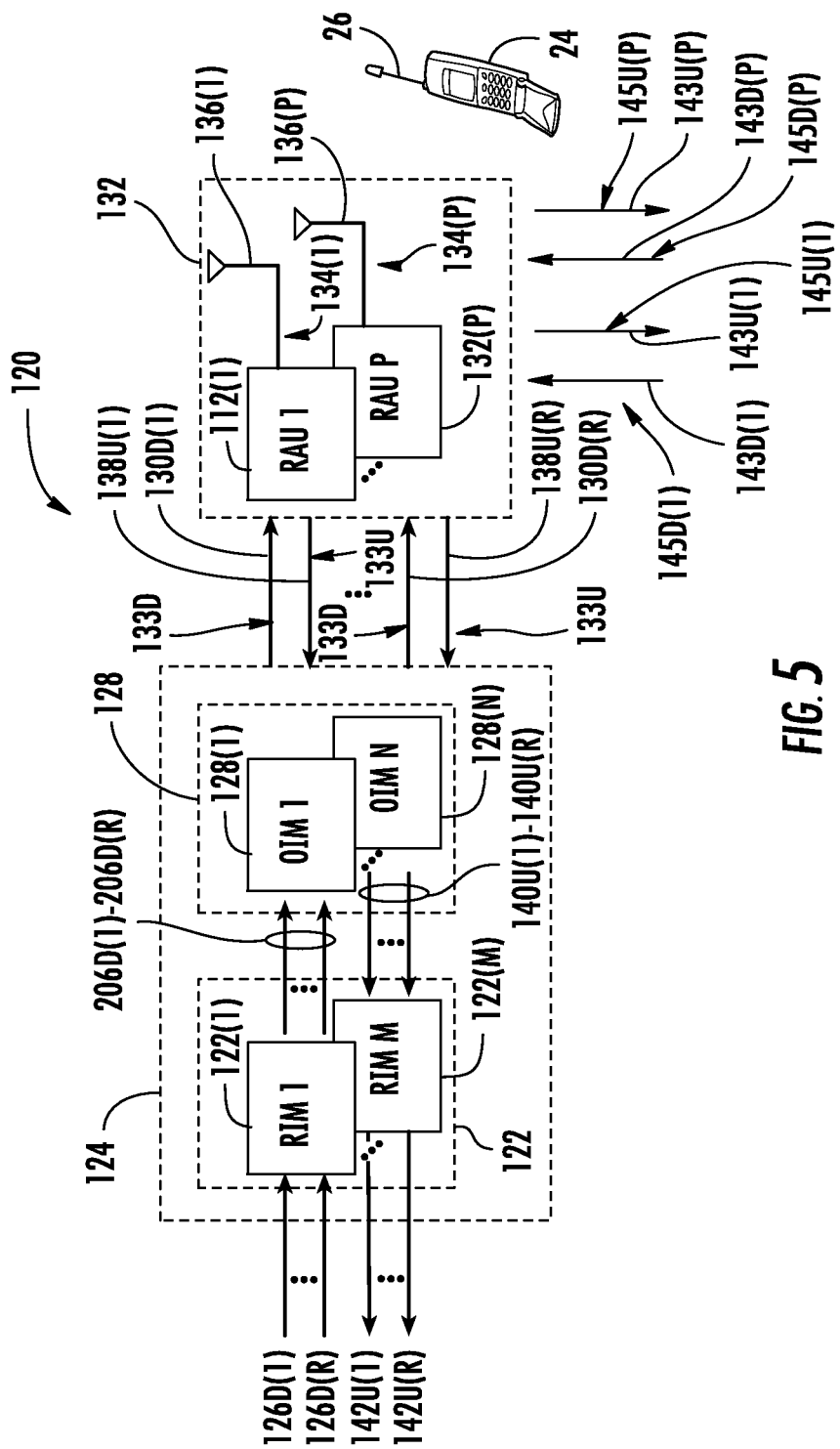
FIG. 5 is a schematic diagram of an exemplary distributed antenna system with alternative equipment to provide RF communication services over optical fiber and digital data services as electrical signals to RAUs or other remote communications devices in an optical fiber-based distributed antenna system.

FIG. 5 is a schematic diagram of another exemplary distributed antenna system 120 that may be employed according to the embodiments disclosed herein to provide RF communication services. In this embodiment, the distributed antenna system 120 includes optical fiber for distributing RF communication services. The distributed antenna system 120 in this embodiment is comprised of three (3) main components. One or more radio interfaces provided in the form of radio interface modules (RIMs) 122(1)-122(M) in this embodiment are provided in HEE 124 to receive and process downlink electrical RF communications signals 126D(1)-126D(R) prior to optical conversion into downlink optical RF communications signals. The RIMs 122(1)-122(M) provide both downlink and uplink interfaces. The processing of the downlink electrical RF communications signals 126D(1)-126D(R) can include any of the processing previously described above in the HEE 12 in FIGS. 1-4. The notations "1-R" and "1-M" indicate that any number of the referenced component, 1-R and 1-M, respectively, may be provided. As will be described in more detail below, the HEE 124 is configured to accept a plurality of RIMs 122(1)-122(M) as modular components that can easily be installed and removed or replaced in the HEE 124. In one embodiment, the HEE 124 is configured to support up to four (4) RIMs 122(1)-122(M) as an example.

Each RIM 122(1)-122(M) can be designed to support a particular type of radio source or range of radio sources (i.e., frequencies) to provide flexibility in configuring the HEE 124 and the distributed antenna system 120 to support the desired radio sources. For example, one RIM 122 may be configured to support the Personal Communication Services (PCS) radio band. Another RIM 122 may be configured to support the 700 MHz radio band. In this example, by inclusion of these RIMs 122, the HEE 124 would be configured to support and distribute RF communications signals on both PCS and LTE 700 radio bands. RIMs 122 may be provided in the HEE 124 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 122 may be provided in the HEE 124 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 122 may be provided in the HEE 124 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 126D(1)-126D(R) are provided to a plurality of optical interfaces provided in the form of optical interface modules (OIMs) 128(1)-128(N) in this embodiment to convert the downlink electrical RF communications signals 126D(1)-126D(N) into downlink optical RF signals 130D(1)-130D(R). The notation "1-N" indicates that any number of the referenced component 1-N may be provided. The OIMs 128 may be configured to provide one or more optical interface components (OICs) that contain O/E and E/O converters, as will be described in more detail below. The OIMs 128 support the radio bands that can be provided by the RIMs 122, including the examples previously described above. Thus, in this embodiment, the OIMs 128 may support a radio band range from 400 MHz to 2700 MHz, as an example, so providing different types or models of OIMs 128 for narrower radio bands to support possibilities for different radio band-supported RIMs 122 provided in the HEE 124 is not required. Further, as an example, the OIMs 128 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 128(1)-128(N) each include E/O converters to convert the downlink electrical RF communications signals 126D(1)-126D(R) to downlink optical RF signals 130D(1)-130D(R). The downlink optical RF signals 130D(1)-130D(R) are communicated over downlink optical fiber(s) 133D to a plurality of RAUs 132(1)-132(P). The notation "1-P" indicates that any number of the referenced component 1-P may be provided. O/E converters provided in the RAUs 132(1)-132(P) convert the downlink optical RF signals 130D(1)-130D(R) back into downlink electrical RF communications signals 126D(1)-126D(R), which are provided over downlinks 134(1)-134(P) coupled to antennas 136(1)-136(P) in the RAUs 132(1)-132(P) to client devices in the reception range of the antennas 136(1)-136(P).

Figure 6:
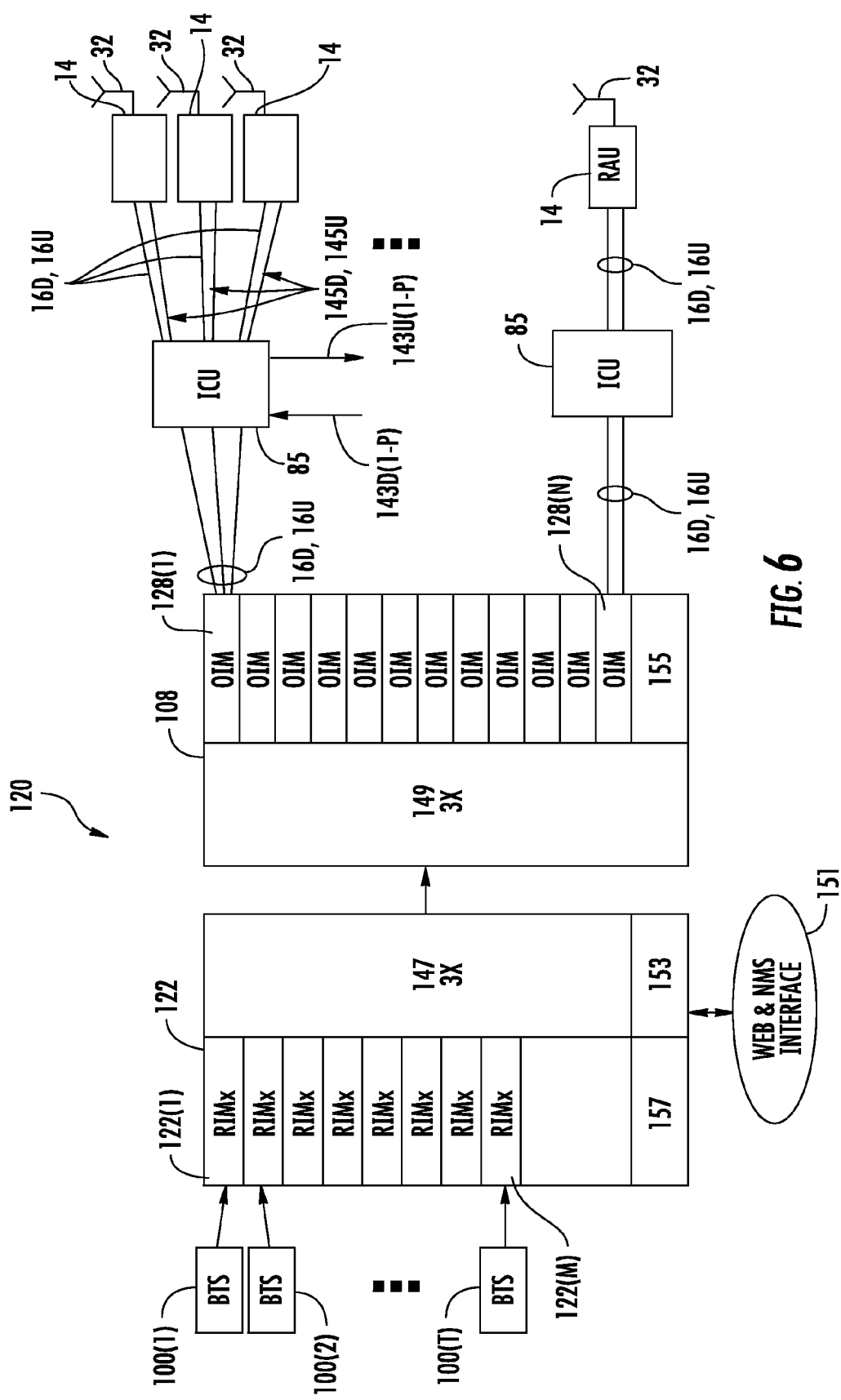
FIG. 6 is a schematic diagram of providing digital data services as electrical signals and RF communication services over optical fiber to RAUs or other remote communications devices in the optical fiber-based distributed antenna system of FIG. 5.

E/O converters are also provided in the RAUs 132(1)-132(P) to convert uplink electrical RF communications signals 126U(1)-126U(R) received from client devices through the antennas 136(1)-136(P) into uplink optical RF signals 138U(1)-138U(R) to be communicated over uplink optical fibers 133U to the OIMs 128(1)-128(N). The OIMs 128(1)-128(N) include O/E converters that convert the uplink optical signals 138U(1)-138U(R) into uplink electrical RF communications signals 140U(1)-140U(R) that are processed by the RIMs 122(1)-122(M) and provided as uplink electrical RF communications signals 142U(1)-142U(R). Downlink electrical digital signals 143D(1)-143D(P) communicated over downlink electrical medium or media (hereinafter "medium") 145D(1)-145D(P) are provided to the RAUs 132(1)-132(P), such as from a digital data services (DDS) controller and/or DDS switch as provided by example in FIG. 5, separately from the RF communication services, as well as uplink electrical digital signals 143U(1)-143U(P) communicated over uplink electrical medium 145U(1)-145U(P), as also illustrated in FIG. 6. Common elements between FIG. 5 and FIG. 6 are illustrated in FIG. 6 with common element numbers. Power may be provided in the downlink and/or uplink electrical medium 145D(1)-145D(P) and/or 145U(1)-145U(P) to the RAUs 132(1)-132(P).

FIG. 6 is a schematic diagram of providing digital data services and RF communication services to RAUs and/or other remote communications units in the distributed antenna system 120 of FIG. 6. Common components between FIGS. 5 and 6 and other figures provided have the same element numbers and thus will not be re-described. As illustrated in FIG. 6, a power supply module (PSM) 153 may be provided to provide power to the RIMs 122(1)-122(M) and radio distribution cards (RDCs) 147 that distribute the RF communications from the RIMs 122(1)-122(M) to the OIMs 128(1)-128(N) through RDCs 149. A PSM 155 may also be provided to provide power the OIMs 128(1)-128(N). An interface 151, which may include web and network management system (NMS) interfaces, may also be provided to allow configuration and communication to the RIMs 122(1)-122(M) and other components of the distributed antenna system 120. A microcontroller, microprocessor, or other control circuitry 157 may be included in HEE 160 (FIG. 7) to provide control operations for the HEE 160, including the determination of propagation delay in the distributed antenna system 120.

As discussed above with regard to FIGS. 1-6, the remote antenna units in distributed antenna systems can be distributed throughout locations inside a building to extend wireless communication coverage throughout the building. This may be advantageous when wireless communication coverage inside a building would otherwise be poor or not possible due to the indoor environment. However, other services may be affected as a result of providing distributed antenna systems. For example, cellular communications protocols may be time or delay based protocols. As non-limiting examples, time delay of arrival (TDOA) or Advanced Forward Link Translation (AFLT) techniques or algorithms may be used to determining delay of communications signals with client devices. However, distributing cellular communications to remote antenna units inside a building or other environment can increase delay due to the propagation delay of the communications signals being distributed to the remote antenna units and responses received at the remote antenna units being distributed back to head-end equipment. If the delay exceeds a certain level, the bandwidth of the communications system may be reduced. As another example, providing localization services for a client, such as emergency 911 (E911) services, may be determined or calculated based on over-the-air delay between communications from a client and a communications tower. However, if the client is communicating over a distributed antenna system, the propagation delay of the distributed antenna system increases the delay, thus possibly resulting in an incorrect determination of location of the client.

Propagation delay can be compensated for in a cellular communications system, but the cellular communications system may be unaware of distributed antenna systems that will increase the propagation delay. Delay can be compensated for in a cellular communications system, but the cellular communications system may be unaware of indoor distributed antenna systems that increase delay as a result of propagation delay. Also, a cellular communications system may provide for the ability to set a flag or other indicator to indicate that distributed antenna systems are present in coverage areas for communications antenna or towers. However, this setting may only provide for the ability of the cellular communications system to approximate additional propagation delay present which may not be accurate.

Figure 7:
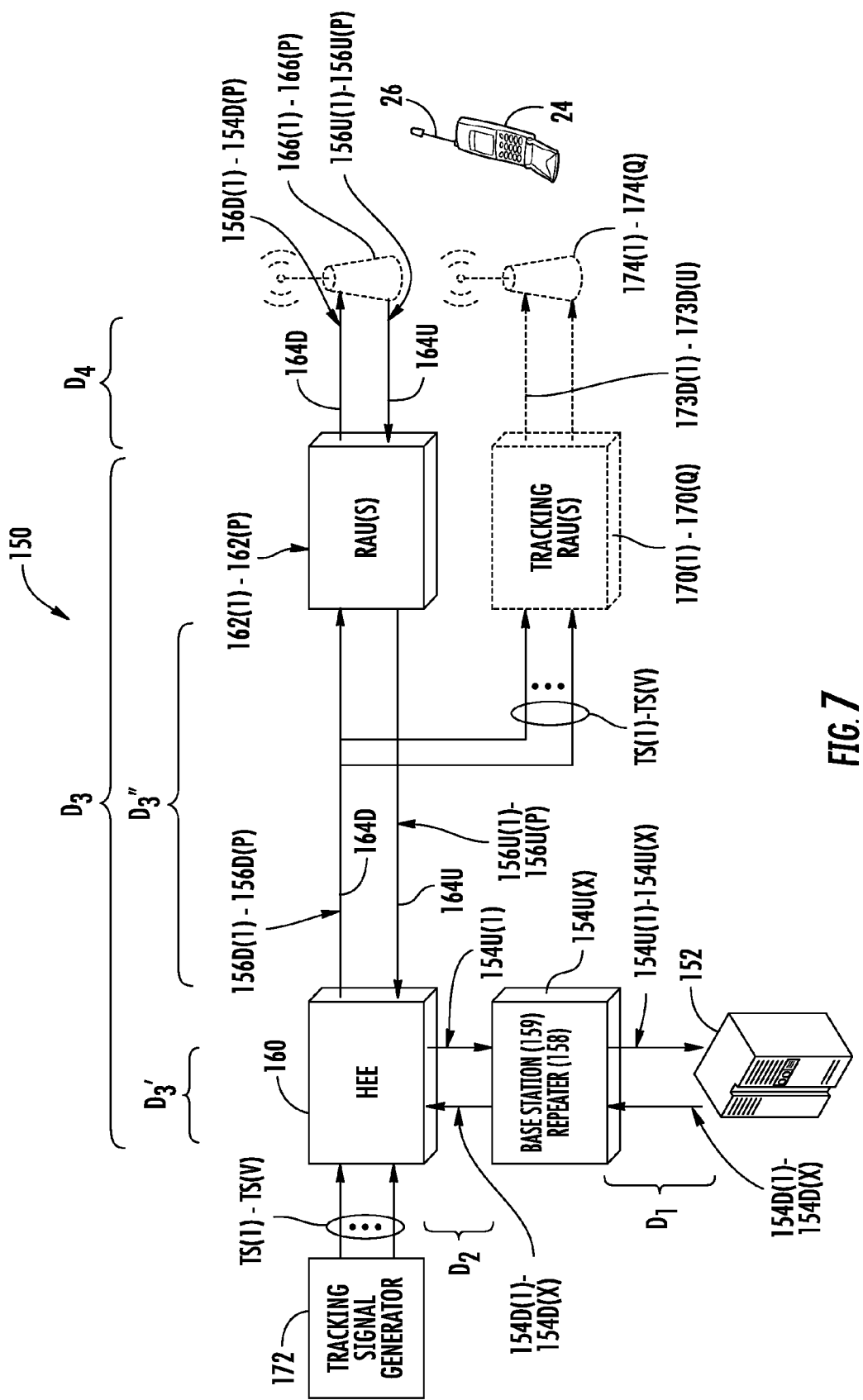
FIG. 7 is a schematic diagram of an exemplary distributed antenna system illustrating propagation delays present in the distributed antenna system.

In this regard, embodiments disclosed below include components, systems, and methods for determining propagation delay of communications in distributed antenna systems. Such distributed antenna systems may be any of the distributed antenna systems 10, 120 described above as non-limiting examples. Another example of a distributed antenna system 150 is provided in FIG. 7 to illustrate propagation delay. The distributed antenna system 150 could be any of the distributed antenna systems 10, 120 described above with regard to FIGS. 1-6. As illustrated in FIG. 7, network management equipment 152 may be provided by a communications provider, such as a cellular network provider as an example. The network management equipment 152 may be circuit switched or packet switched network equipment as examples. Downlink and uplink communications signals 154D(1)-154D(X), 154U(1)-154U(X) may be provided from and to the network management equipment 152 to a base station 159 to be interfaced with the distributed antenna system 150. The notation "1-X" indicates that any number of downlink and uplink communications signals may be provided from and to the network management equipment 152 to the base station 159 to be interfaced with the distributed antenna system 150. The base station 159 may act as a repeater 158 if communications signal levels need to be amplified to maintain signal integrity. Propagation delay $D_1$ is shown between the network management equipment 152 and the base station 159/repeater 158 to signify the propagation delay therebetween.

With continuing reference to FIG. 7, the downlink and uplink communications signals 154D(1)-154D(X), 154U(1)-154U(X) can be interfaced to HEE 160. The HEE 160 may include any of the equipment previously described above for the HEE 12, 90 in FIGS. 1-6 as examples. Propagation delay $D_2$ is shown between the base station 159/repeater 158 and the HEE 160 to signify the propagation delay therebetween. As previously discussed, communications signals, namely the downlink and uplink communications signals 154D(1)-154D(X), 154U(1)-154U(X), are split and communicated between the HEE 160 and RAUs 162(1)-162(P) as downlink and uplink communications signals 156D(1)-156D(P), 156U(1)-156U(P) over downlink and uplink communications medium 164D, 164U. The notation "1-P" signifies that the downlink communications signals 156D(1)-156D(P) may be split by the HEE 160 into any number of downlink communications signals desired according to the number of RAUs 162 supported by the distributed antenna system 150. The notation "1-P" also signifies that the uplink communications signals 156U(1)-156U(P) may be split by the HEE 160 into any number of uplink communications signals desired according to the number of RAUs 162 supported by the distributed antenna system 150.

The downlink and uplink communications medium 164D, 164U may be any medium, including but not limited to electrical conductor, optical fiber, and air (i.e., wireless transmission). Propagation delay $D_3$ is shown between the HEE 160 and the RAUs 162(1)-162(P) to signify the propagation delay therebetween. Propagation delay $D_3$ comprises propagation delay $D_3'$ present in the distribution of the downlink and uplink communications signals 156D(1)-156D(P), 156U(1)-156U(P) in the HEE 160 and propagation delay $D_3''$ present over the downlink and uplink communications medium 164D, 164U. The downlink and uplink communications medium 164D, 164U may comprise 1-P individual lines dedicated to each RAU 162(1)-162(P), or single lines whereby the downlink and uplink communications signals 156D(1)-156D(P), 156U(1)-156U(P) are multiplexed on the single lines. If the downlink and uplink communications medium 164D, 164U is optical fiber, WDM may be employed as an example. If the downlink and uplink communications medium 164D, 164U is electrical conductors or air (i.e., wireless transmission), FDM may be employed as an example.

With continuing reference to FIG. 7, the downlink communications signals 156D(1)-156D(P) are communication by the RAUs 162(1)-162(P) to antennas 166(1)-166(P) to be transmitted over the air wirelessly to client devices 24 in the range of the antennas 166(1)-166(P). Normally, the client device 24 is in range of one of the antennas 166(1)-166(P). Propagation delay $D_4$ is shown between the RAUs 162(1)-162(P) and the antennas 166(1)-166(P) to signify the propagation delay therebetween. Because the antennas 166(1)-166(P) are normally provided within the same housing of the RAUs 162(1)-162(P) or in close proximity to the RAUs 162(1)-162(P), the propagation delay $D_4$ may be negligible as compared with the propagation delay $D_3$. The client devices 24 can communicate uplink communications signals 156U(1)-156U(P) to one or more of the antennas 166(1)-166(P) to be distributed to the RAUs 162(1)-162(P). Again, the propagation delay $D_4$ is shown between the antennas 166(1)-166(P) and the RAUs 162(1)-162(P) to signify the propagation delay therebetween. The uplink communications signals 156U(1)-156U(P) are communicated from the RAUs 162(1)-162(P) to the HEE 160 over uplink communications medium 164U. Again, the propagation delay $D_3$ is shown between the RAUs 162(1)-162(P) and the HEE 160 to signify the propagation delay therebetween. The uplink communications signals 156U(1)-156U(P) are communicated from the HEE 160 to the base station 159/repeater 158 and the network management equipment 152, which incur propagation delays $D_2$ and $D_1$, respectively.

Thus, the total propagation delay from the network management equipment 152 to the antennas 166(1)-166(P) for downlink communications is $D_1+D_2+D_3+D_4$. The round trip delay from the network management equipment 152 to the antennas 166(1)-166(P) and back for downlink and uplink communications is $2*(D_1+D_2+D_3+D_4)$. The network management equipment 152 may be aware of propagation delays $D_1$ and $D_2$ depending on configuration. However, the network management equipment 152 may be unaware of propagation delays $D_3$ and $D_4$ due to the distributed antenna system 150. Or, the network management equipment 152 may be aware of propagation delays $D_3$ and $D_4$, but such delays are assumed as constant delays, which may not be the actual propagation delays and thus may be inaccurate.

In the example of an optical fiber communication medium, the optical fiber distance is equal to the product of velocity (i.e., speed of light) and time (i.e., propagation delay). Transmission in optical fiber experiences an approximately five (5) nanosecond (ns) delay per meter, since light travels about half the speed of light compared to an RF transmission over the air. This distance can be used to approximate the location of the RAUs 162(1)-162(P) if the coordinates of the HEE 160 are known in this example. Both the HEE 160 coordinates and the propagation delay can be used to calculate the location of the client device 24 in a distributed antenna system using a triangulation and time of flight approach as an example.

In this regard, in embodiments discussed, the propagation delay of communications signals distributed in the distributed antenna systems is determined As a non-limiting example, the propagation delays $D_3$ and/or $D_4$ may be determined in the distributed antenna system 150 of FIG. 7 to provide this information to the network management equipment 152 or other system or device. As will be discussed in more detail below, components may be employed in the distributed antenna system 150 in FIG. 7 to determine propagation delays $D_3$ and/or $D_4$. The determined propagation delay(s) can be provided by the distributed antenna system 150 to be taken into consideration for communications signal services or operations that are based on communications signal delay. Delay based operations may be made more effective, efficient, and/or accurate by knowing the propagation delay experienced in a distributed antenna system. As a non-limiting example, the propagation delay(s) may be associated with communication antennas or towers that are mapped and stored in a database(s) to be used for communications services or operations based on communications signal delay. As another non-limiting example, the arrangement of the base station 159, repeaters 158, or communication towers in a network may be repositioned based on the determined propagation delay.

Further, as an example, the propagation delay $D_3$ in the distributed antenna system 150 in FIG. 7 may be different depending on which RAU 162(1)-162(P)/antenna 166(1)-166(P) combination the client device 24 is communicating. This is because the RAUs 162(1)-162(P) may be placed at different locations where the distance between each of the RAUs 162(1)-162(P) varies with respect to the HEE 160. Thus, embodiments disclosed herein also allow determination of the propagation delay on a per RAU 162(1)-162(P) basis. In this regard, the particular RAU 162(1)-162(P) in which the client device 24 is in communication may be determinable or known. In this regard, in certain embodiments disclosed herein, the client device 24 is configured to include client device identification information as uplink communication data to the RAU 162(1)-162(P) and to the HEE 160 and network management equipment 152 without receiving a tracking signal or other signal configured to provide localization services. For example, Global System for Mobile Communications (GSM) network compatible client devices are configured to automatically initiate providing client device identification information over a network. The locations of the RAUs 162(1)-162(P) in the distributed antenna system 150 are configured and known in the HEE 160. By knowing and correlating the particular RAU 162(1)-162(P) in which the client device 24 established communication, the HEE 160 is able to determine and/or provide the location of the client device 24 as being within the antenna coverage area formed by the particular RAU 162(1)-162(P). The correlation of client device identification information from the client device 24 with the location of the RAU 162(1)-162(P) is retained when communicated to the HEE 160 and is not lost by being combined, such as by splitters or combiners as examples, with communications from other RAUs 162(1)-162(P).

In other embodiments, a signal used for determining the location of client devices 24 (also referred to herein as "tracking signal"), and which may also be referred to as a pilot signal, beacon signal, or pilot beacon signal, is distributed by the HEE 160 to one or more tracking RAUs 170(1)-170(Q) in the distributed antenna system 150. The notation "1-Q" is to signify that any number of tracking RAUs desired may be provided in the distributed antenna system 150. Determined propagation delay can be associated with a particular client device 24 based on a determination of which tracking RAU 170(1)-170(Q) the client device 24 is most closely located. For example, signal strength may be used to determine which tracking RAU 170(1)-170(Q) the client device 24 is most closely located. One or more tracking signals TS(1)-TS(V) may be generated by a tracking signal generator 172 or pilot or beacon generator as examples. The notation "1-V" indicates that any number of tracking signals may be generated. The tracking signals TS(1)-TS(V) may be unique signals that can be associated with a particular location or zone in the optical fiber-based distributed antenna system. For example, in a code division multiple access (CDMA) network, cell identification is included in a channel separate from communications traffic that can be used as the tracking signals TS(1)-TS(V). In this manner, the tracking signals TS(1)-TS(V) are radiated through downlink communications medium 173D(1)-173D(U) to antennas 174(1)-174(Q) associated with the tracking RAUs 170(1)-170(Q) to be communicated to client devices 24 within range of the antenna coverage area formed by the tracking RAUs 170(1)-170(Q). The notation "1-U" indicates that any number of downlink communications medium may be generated.

When the client device 24 wirelessly receives a tracking signal TS(1)-TS(V), the client device 24 communicates its identification information and identification of the tracking signal TS(1)-TS(V) back to one of the antennas 166(1)-166(P) and through the uplink communications medium 164U to the RAUs 162(1)-162(P) to be communicated back to the HEE 160. The HEE 160 can provide this information to a network or carrier. In this manner, the client device identification information and identification of the tracking signal TS(1)-TS(V) can be associated with the location of a particular RAU 162(1)-162(P) that received and transmitted the tracking signal TS(1)-TS(V) in the distributed antenna system 150 to provide or determine a location of the client device 24.

Figure 8:
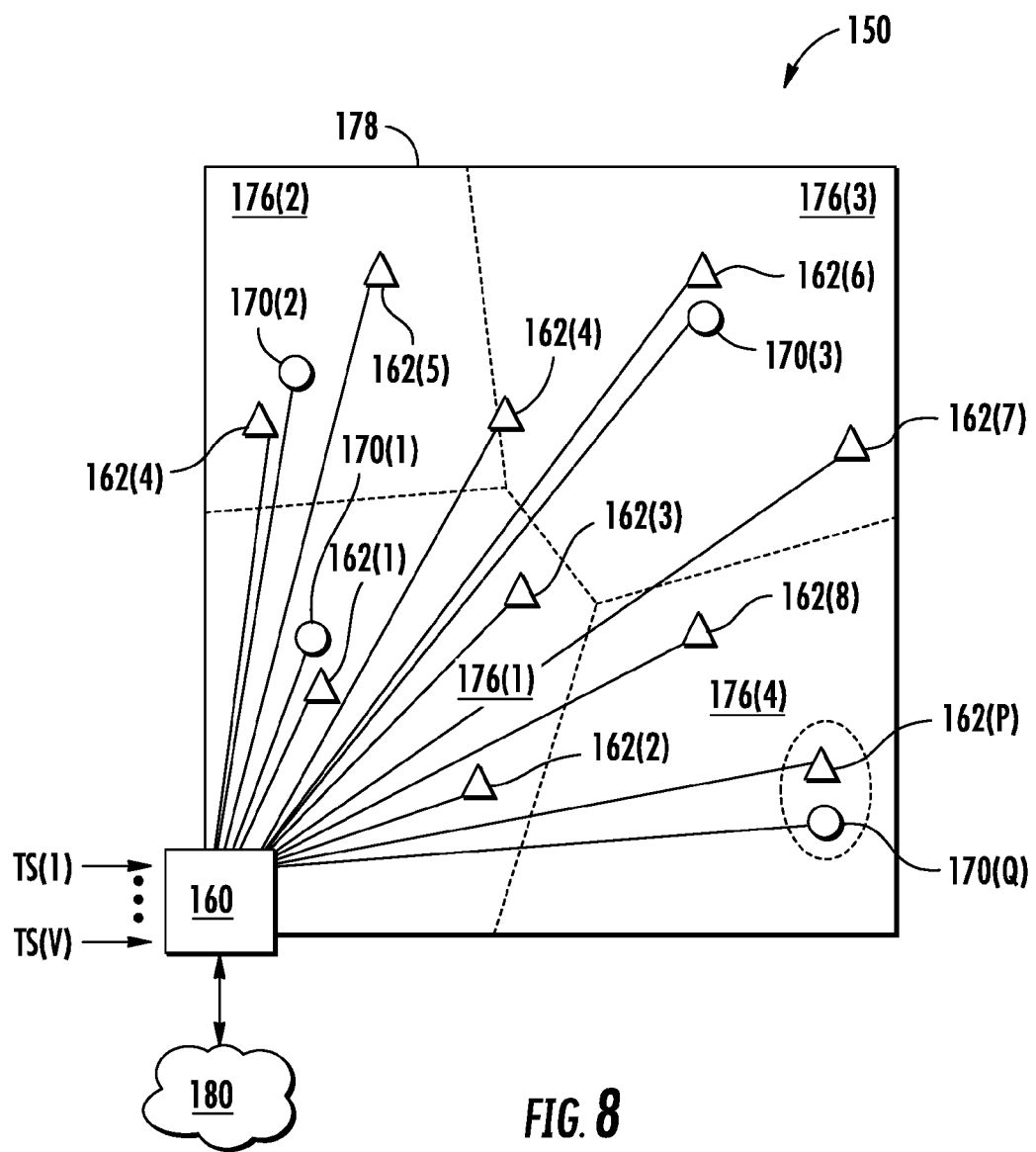
FIG. 8 is a schematic diagram of an exemplary distributed antenna system configured to communicate tracking signals to tracking RAUs to provide localization services for client devices.

In this regard, FIG. 8 illustrates a schematic diagram of the exemplary distributed antenna system 150 that is configured to communicate tracking signals TS(1)-TS(V) from the HEE 160 to certain tracking RAUs 170(1)-170(Q) to provide localization services. The tracking RAUs 170(1)-170(Q) can contain the same components and configuration as the RAUs 162(1)-162(P). Thus, this configuration of the distributed antenna system 150 employs the tracking signal TS(1)-TS(V) provided on downlinks to the tracking RAUs 170(1)-170(Q) to provide localization services. The difference is that the tracking RAUs 170(1)A-170(Q) are communicatively coupled to channels or links provided by the HEE 160 that are dedicated to carry the tracking signal TS(1)-TS(V). Each tracking signal TS(1)-TS(V) has a unique identification from the other tracking signals TS(1)-TS(V) in this embodiment. The tracking RAUs 170(1)-170(Q) selected to receive tracking signals TS(1)-TS(V) can be strategically located within different tracking zones 176 in a building 178 or other infrastructure. For example, FIG. 8 illustrates four tracking zones 176(1)-176(4). Each tracking zone 176(1)-176(4) may represent a floor within the building 178 wherein a tracking RAU 170(1)-170(Q) is located on each floor.

With continuing reference to FIG. 8, in this embodiment, the tracking signal TS(1)-TS(V) is not used for communications, and the client devices 24 can receive the tracking signal TS(1)-TS(V) from the tracking RAUs 170(1)-170(Q) over a greater distance than communications. Thus, when client devices 24 are located within range of a particular tracking RAU 170(1)-170(Q), the client device 24 will receive the particular tracking signal TS(1)-TS(V) designated for the floor communicated to the tracking RAU 170(1)-170(Q). The client device 24 can then communicate client device identification information regarding the received tracking signal TS(1)-TS(V) back to the HEE 160 and over a network 180. Thus, the particular floor in which the client device 24 is located can be provided or determined. Note that although the example of tracking illustrates four (4) tracking zones 176(1)-176(4), the disclosure herein is not limited to providing a particular number of tracking zones or tracking RAUs placed in the tracking zones to receive and wirelessly transmit a tracking signal to client devices.

With continuing reference to FIG. 8, other RAUs 162(1)-162(P) that are not configured to receive and wirelessly transmit the tracking signals TS(1)-TS(V) are also provided in the distributed antenna system 150. In this embodiment, these RAUs 162(1)-162(P) form antenna coverage areas in each of the tracking zones 176(1)-176(4) that are not associated with providing tracking signals or location services. The RAUs 162(1)-162(P) can be like the RAUs 14, 132 previously described and illustrated in FIGS. 1-6 that provide downlink network communications to client devices in range of the antenna coverage areas and receive wireless communications from the client devices to communicate uplink communication data back to the HEE 160 and over the network 180. More than one RAU 162(1)-162(P) may be provided in a given zone 176(1)-176(4) to provide communications between client devices 24 inside the building 178 and the network 180.

As also illustrated in FIG. 8, the tracking RAUs 170(1)-170(Q) could also be configured to transmit downlink communication data to client devices 24 in addition to the tracking signals TS(1)-TS(V). For example, tracking RAU 170(Q) is configured to receive both tracking signal TS(3) and downlink communication data from the HEE 160 and transmit both to client devices 24 in range of the tracking RAU 170(Q). When the client device 24 is in range of the tracking RAU 170(Q), the client device 24 receives the tracking signal TS(3) and the downlink communication data. The client device 24 can transmit client device identification information and uplink communication data back to the HEE 160 and over the network 180. The tracking RAU 170(Q) may be configured to receive uplink communication data from a client device 24, or may be configured to only transmit the tracking signal TS(3) and downlink communication data to a client device 24. In the latter case, a second RAU 162(P) located in proximity to the tracking RAU 170(Q) may be configured to receive the client device identification information and uplink communication data from the client device 24 to provide to the HEE 160 and the network 180.

Figure 9:
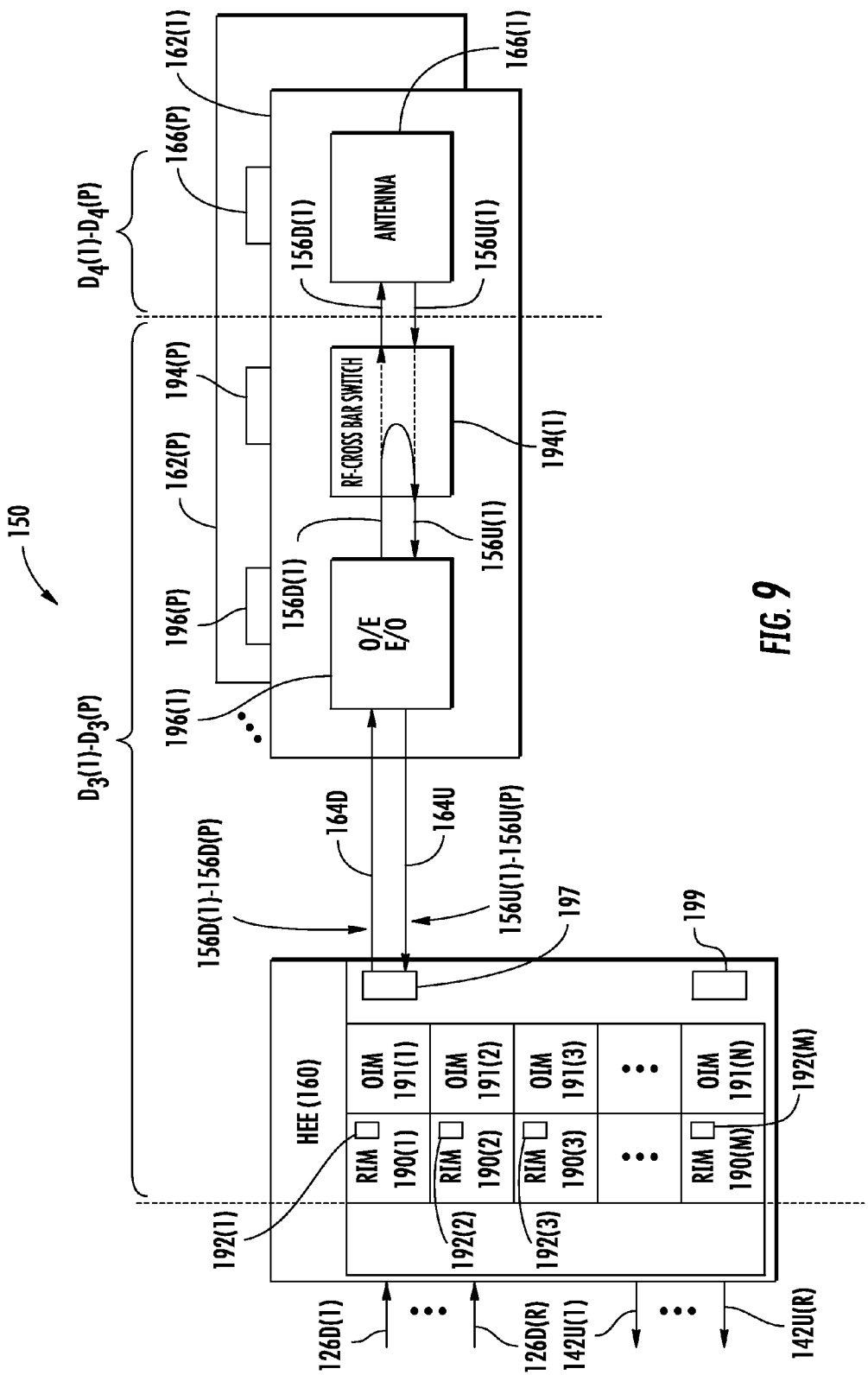
FIG. 9 is a schematic diagram of determining total propagation delay within the exemplary distributed antenna system in FIG. 7.

FIG. 9 is a schematic diagram of determining total propagation delay within the exemplary distributed antenna system 150 in FIG. 7. Note however that determining total propagation delay could also be performed in the exemplary distributed antenna systems 10, 120 discussed above as well, and the embodiments of determining propagation delay herein are not limited to any particular type or configuration of distributed antenna system. Common elements with the distributed antenna system 150 in FIG. 7 are provided with common element numbers in FIG. 9. In this embodiment, determining the total propagation delay within the distributed antenna system 150 consists of determining propagation delay of the distribution of the downlink communications signals 156D(1)-156D(P) to the RAUs 162(1)-162(P) and the propagation delay of distribution of the uplink communications signals 156U(1)-156U(P) to the HEE 160. In this embodiment, this delay consists of the propagation delay $D_3$, because it is assumed that the propagation delay $D_4$ from the RAUs 162(1)-162(P) to the antennas 166(1)-166(P), as illustrated in FIG. 7, is negligible when compared to the propagation delay $D_3$. Also, the propagation delay $D_3$ in this embodiment consists of a plurality of propagation delays $D_3(1)$-$D_3(P)$ since each RAU 162(1)-162(P) may not be located the same distance from the HEE 160 and/or communicatively coupled using the same type of communications medium.

With continuing reference to FIG. 9, to determine the propagation delays $D_3(1)$-$D_3(P)$, a propagation delay measurement circuit(s) 192(1)-192(M) may be associated with each RIM 190(1)-190(M) in the HEE 160. By providing the propagation delay measurement circuits 192(1)-192(M) associated with each RIM 190(1)-190(M), the propagation delay from the RIMs 190(1)-190(M) to the RAUs 162(1)-162(P) can be determined, which is estimated in this embodiment to be the total propagation delay of the distributed antenna system 150. The propagation delay measurement circuit 192 is used to measure the propagation delay of the time to distribute the downlink communications signals 156D(1)-156D(P) from the RIMs 190(1)-190(M) and OIMs 191(1)-191(N) to the RAUs 162(1)-162(P) and for responsive uplink communications signals 156U(1)-156U(P) to be distributed back from the RAUs 162(1)-162(P) to the HEE 160 in this embodiment. The RIMs 190(1)-190(M) may be like the RIMs 120(1)-120(M) illustrated in FIGS. 5 and 6 and previously described above. The OIMs 191(1)-191(N) may be like the OIMs 122(1)-122(M) illustrated in FIGS. 5 and 6 and previously described above. Examples of propagation delay measurement circuits that may be provided as the propagation delay measurement circuit 192 are described in more detail below. In this embodiment, because multiple RAUs 162(1)-162(P) are provided, the propagation delay $D_3$ will be composed of a plurality of propagation delays $D_3(1)$-$D_3(P)$. The longest of the propagation delays $D_3(1)$-$D_3(P)$ may be considered to be the propagation delay of the distributed antenna system 150 or an average of the propagation delays $D_3(1)$-$D_3(P)$ as non-limiting examples.

With continuing reference to FIG. 9, to measure propagation delay, RF cross bar switches 194(1)-194(P) are provided in each of the RAUs 162(1)-162(P). The RF cross bar switches 194(1)-194(P) are coupled to O/E and E/O converters 196(1)-196(P) in the RAUs 162(1)-162(P). The RF cross bar switches 194(1)-194(P) are provided to reverse received downlink communications signals 156D(1)-156D(P) received on the downlink communications medium 164D back onto the uplink communications medium 164U as uplink communications signals 156U(1)-156U(P) before the downlink communications signals 156D(1)-156D(P) are distributed to the antennas 166(1)-166(P). The propagation delay measurement circuit 192 measures the time between when the downlink communications signals 156D(1)-156D(P) are distributed from the HEE 160 and when the downlink communications signals 156D(1)-156(P) are received back at the propagation delay measurement circuit 192 as uplink communications signals 156U(1)-156U(P) to determine the propagation delay $D_3$. The propagation delay measurement circuit 192 will measure the propagation delay for one communication path between the HEE 160 and a particular RAU 162.

Figure 10:
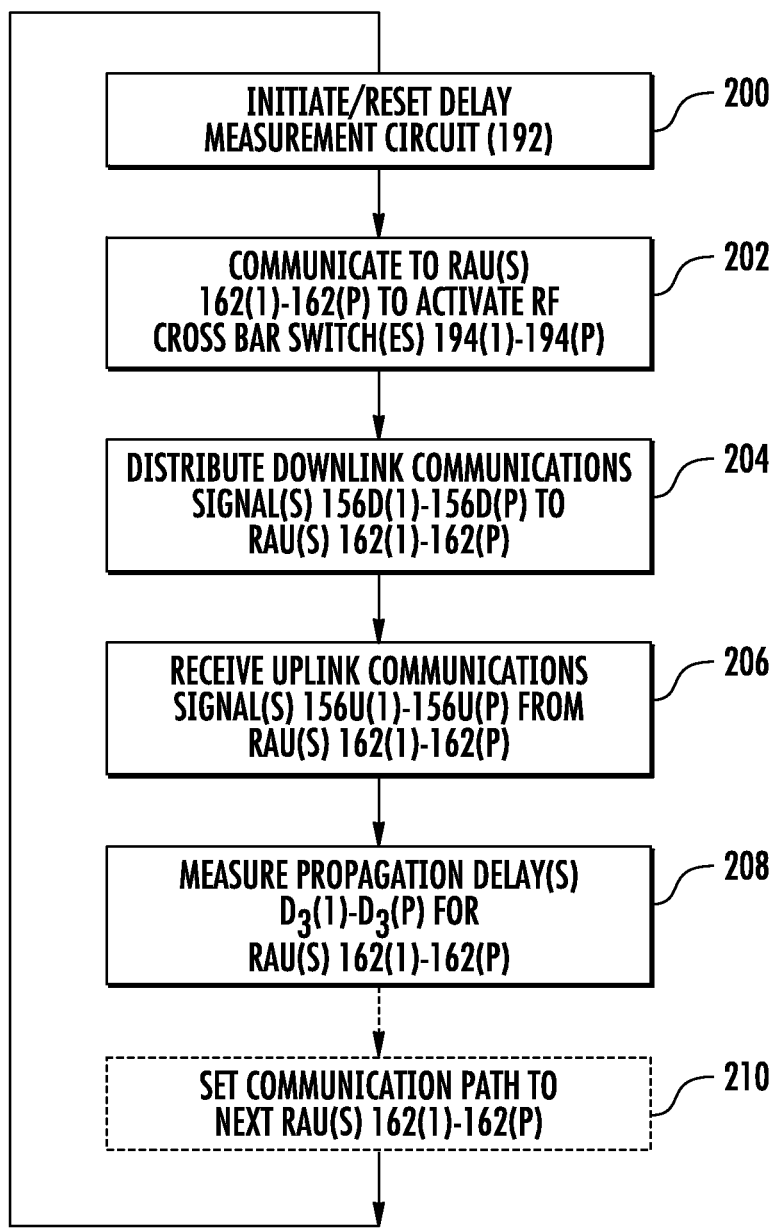
FIG. 10 is a flowchart illustrating an exemplary process of measuring total propagation delay within the exemplary distributed antenna system in FIG. 9.

With continuing reference to FIG. 9 and as illustrated in the exemplary flowchart in FIG. 10, to measure the propagation delay $D_3(1)$-$D_3(P)$ for each RAU 162(1)-162(P), the HEE 160 can be configured to control the distribution of downlink communications signals 156D(1)-156D(P). Propagation delay may be measured for each RAU 162(1)-162(P) communications path before normal RF communications are allowed to be active in the distributed antenna system 150. A head-end controller (HEC) 199 or other control circuitry may be provided in the HEE 160, as illustrated in FIG. 9, to perform the process in FIG. 10 to determine propagation delay. In this regard, the HEC 199 can initiate or reset the propagation delay measurement circuit 192, as illustrated in FIG. 10 (block 200 in FIG. 10). The HEC 199 also communicates to an RAU(s) 162(1)-162(P) to activate the RF cross bar switch(es) 194(1)-194(P) to redirect the received downlink communications signals 156D(1)-156D(P) to the uplink communications medium 164U as the uplink communications signals 156U(1)-156U(P) (block 202 in FIG. 10). The HEC 199 may configure certain components in the HEE 160 so that the downlink communications signals 156D(1)-156D(P) are only distributed to one RAU 162(1)-162(P) at a time during propagation propagation delay measurement. Thereafter, the HEE 160 distributes the downlink communications signals 156D(1)-156D(P) to the RAU(s) 162(1)-162(P) (block 204 in FIG. 10). For example, the distributed downlink communications signals 156D(1)-156D(P) may be of the modulation frequency of serial communications, such as 315

MHz as one non-limiting example. The RF cross bar switch(es) 194(1)-194(P) will direct the received downlink communications signals 154D(1)-154D(P) onto the uplink communications medium 164U as illustrated in FIG. 9. The HEE 160 will receive the uplink communications signals 156U(1)-156U(P) from the RAU(s) 162(1)-162(P) (block 206 in FIG. 10). The propagation delay measurement circuit 192 will then determine the time of receipt of the uplink communications signals 156U(1)-156U(P) to determine the propagation delay(s) $D_3(1)$-$D_3(P)$ for the RAU(s) 162(1)-162(P) (block 208 in FIG. 10).

With continuing reference to FIG. 10, the HEC 199 may be configured to measure the propagation delays $D_3(1)$-$D_3(P)$ for one RAU 162 at a time since the propagation delays $D_3(1)$-$D_3(P)$ will likely be different due to the RAUs 162(1)-162(P) being located at difference distances from the HEE 160. In this regard, the process in FIG. 10 can be performed for one RAU 162 at one time. A switch or switches 197 may be provided in the HEE 160 and controllable by the HEC 199 to be switched to one or more of the RAUs 162(1)-162(P) at a time to set the communication path to distribute communications signals to the desired RAU(s) 162(1)-162(P) (block 210 in FIG. 10). For example, the switch 197 may be comprised of transmit optical sub-assemblies (TOSAs) and receive optical sub-assemblies (ROSAs) that are activated and deactivated to control which RAUs 162(1)-162(P) receive communications signals from the HEE 160. Control of which RAUs 162(1)-162(P) receive communications signals from the HEE 160 provides the identification of the RAU 162(1)-162(P) associated with a given propagation delay determined using the propagation delay measurement circuit 192. When a next propagation delay $D_3$ for a given RAU 162 is to be measured, the HEC 199 can set the communication path to a next RAU 162 (block 210) to measure the propagation delay $D_3$ for the given RAU 162. The process in FIG. 10 can be repeated until all propagation delays $D_3(1)$-$D_3(P)$ for all RAUs 162(1)-162(P) are determined The propagation delays $D_3(1)$-$D_3(P)$ can be stored and communicated by the HEC 199 to the network management equipment 152 (FIG. 7) as desired. The HEC 199 may also store and/or communicate the determined propagation delay along with the identification of the client device 24 and/or the determined location of the client device 24. The location of the client device 24 may be determined or determinable based on the methods discussed above.

Any type of propagation delay measurement circuit may be employed for the propagation delay measurement circuits 192(1)-192(M) in the HEE 160 in FIG. 9 to measure propagation delay. As non-limiting examples, FIGS. 11A-11E are schematic diagrams of exemplary propagation delay measurement circuits that may be employed as the propagation delay measurement circuits 192(1)-192(M).

Figure 11A:
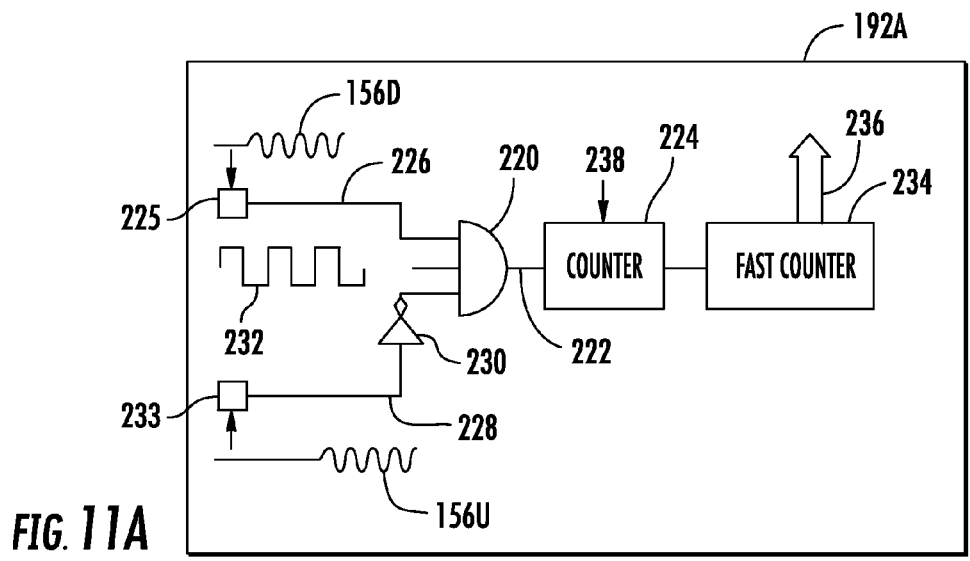
FIGS. 11A-11E are schematic diagrams of exemplary propagation delay measurement circuits used for determining propagation delay in a distributed antenna system.

FIG. 11A illustrates a first example of a propagation delay measurement circuit 192A that employs a fast counter for measuring propagation delay of one communication path between an RIM 190 and an RAU 162. With reference to FIG. 11A, the propagation delay measurement circuit 192A employs an AND gate 220 that provides an output line 222 to a counter 224. The AND gate 220 acts as a switch to activate the counter 224 when a downlink communications signal 156D is active or on the downlink communications medium 164D and the corresponding uplink communications signal 156U is not detected. When the downlink communications signal 156D is detected by a downlink communications signal detector 225 (e.g., a power detector), an input line 226 to the AND gate 220 is raised high (i.e., a Voltage level signifying a logical "1"). The corresponding uplink communications signals 156U will not be detected until the downlink communications signal 156D reaches the configured RAU 162 and is routed through the RF cross bar switch 194 back onto the uplink communications medium 164U. Thus initially, an input line 228 providing a detection of the uplink communications signal 156U will be low (i.e., a Voltage level signifying a logical "0"), which will be inverted by an inverter 230 to provide a high Voltage level to the AND gate 220. During this condition, the output line 222 of the AND gate 220 passes an oscillating clock signal 232 (e.g., a 1.0 GHz signal) to the counter 224 to accumulate clock pulses from the clock signal 232. The accumulated clock pulses are provided to a fast counter 234 to provide a count representative of propagation delay. The frequency of the clock signal 232 should be a frequency that is much greater than the propagation delay so that the resolution of the counter 224 will be sufficient to accurately measurement propagation delay in the distributed antenna system 150.

With continuing reference to FIG. 11A, once the downlink communications signal 156D is detected by an uplink communications signal detector 233 (e.g., a power detector) at the propagation delay measurement circuit 192A as a received uplink communications signal 156U, the input line 228 will be set high. In response, the AND gate 220 will shut off the counter 224. The HEC 199 can read the counter value present in the fast counter 234 over a data bus 236 to determine the propagation delay of the downlink communications signal 156D. Before a subsequent propagation delay is measured using the propagation delay measurement circuit 192A, the counter 224 is reset by the HEC 199 using a reset line 238.

Figure 11B:
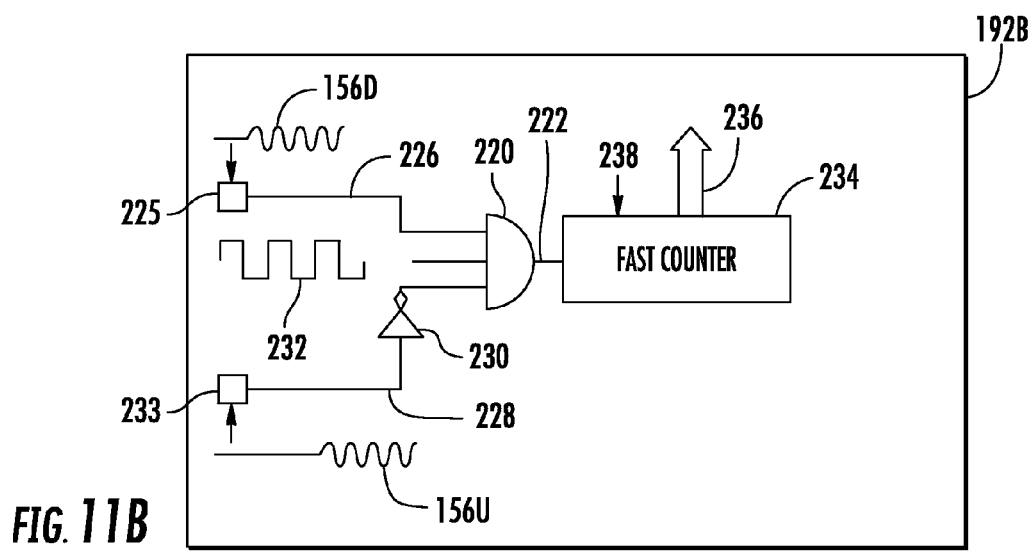
Figure 11C:
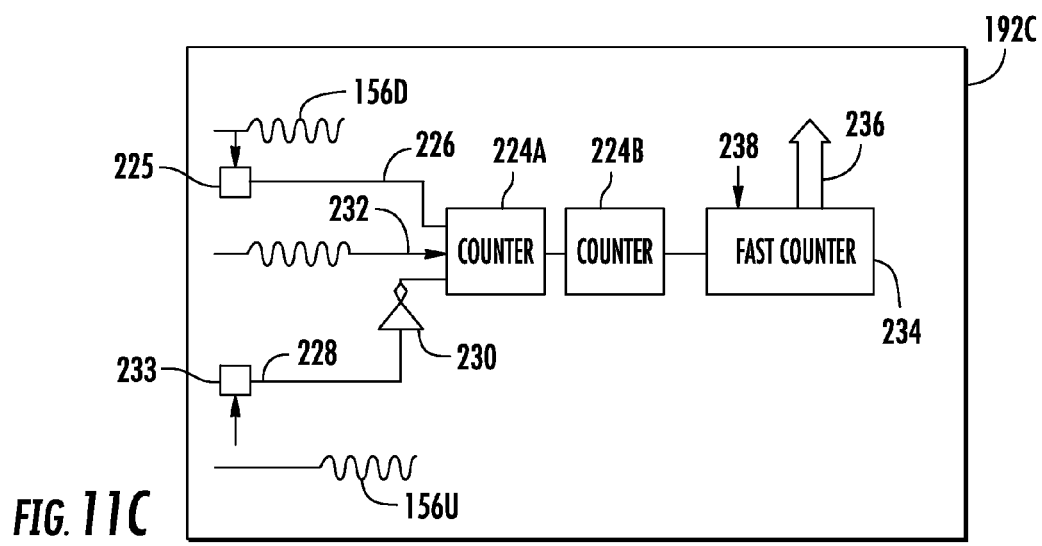
Figure 11D:
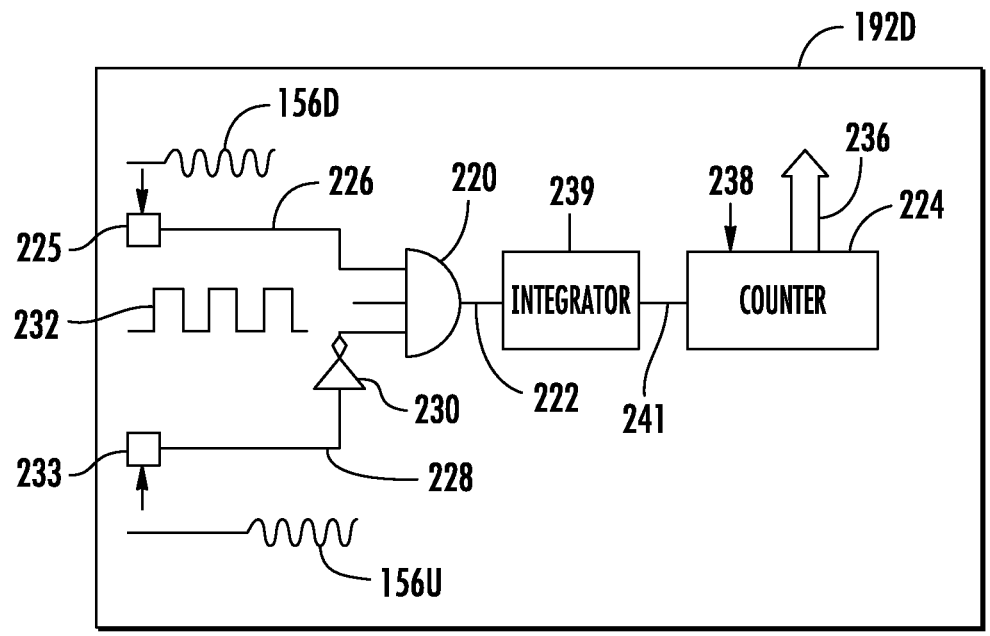

FIGS. 11B-11D illustrate other examples of propagation delay measurement circuits 192. For example, FIG. 11B illustrates an alternate propagation delay measurement circuit 192B that is similar to the propagation delay measurement circuit 192A in FIG. 11A. Common elements are labeled with common element numbers. In the propagation delay measurement circuit 192B in FIG. 11B, the output line 222 from the AND gate 220 is input directly into the fast counter 234. The HEC 199 can read the counter value present in the fast counter 234 over the data bus 236 to determine the propagation delay of the downlink communications signal 156D. FIG. 11C illustrates another alternate propagation delay measurement circuit 192C that is similar to the propagation delay measurement circuit 192A in FIG. 11A. Common elements are labeled with common element numbers. In the propagation delay measurement circuit 192C in FIG. 11C, a first counter 224A is provided as a substitute to an AND gate wherein the clock signals are accumulated by a second counter 224B on detection of the uplink communications signal 156U. The HEC 199 can read the counter value present in the fast counter 234 over the data bus 236 to determine the propagation delay of the downlink communications signal 156D.

FIG. 11D illustrates another alternate propagation delay measurement circuit 192D that is similar to the propagation delay measurement circuit 192A in FIG. 11A. Common elements are labeled with common element numbers. In the propagation delay measurement circuit 192D in FIG. 11D, the output line 222 from the AND gate 220 is input into an analog interrogator circuit 239 to accumulate clock pulses from the clock signal 232. An output 241 from the analog interrogator circuit 239 is provided to the counter 224 to provide the propagation delay. The HEC 199 can read the counter value present in the counter 224 over the data bus 236 to determine the propagation delay of the downlink communications signal 156D.

Figure 11E:
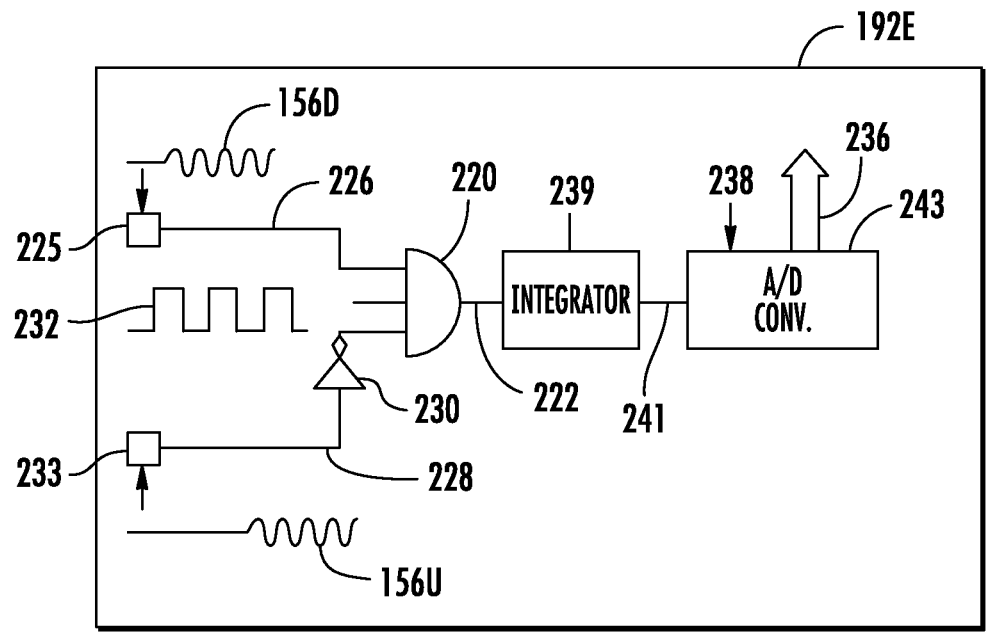

FIG. 11E illustrates another alternate propagation delay measurement circuit 192E that is similar to the propagation delay measurement circuit 192D in FIG. 11D. Common elements are labeled with common element numbers. In the propagation delay measurement circuit 192E in FIG. 11E, the output 241 from the interrogator 239 is input into an analog-to-digital (A/D) converter 243 to convert an analog representation of accumulated clock pulses by the interrogator 239 into a digital representation of propagation delay. The HEC 199 can read the digital value of the propagation delay over the data bus 236 to determine the propagation delay of the downlink communications signal 156D.

The determined propagation delay may depend on the edge detect latencies of the downlink communications signal detector 225 and uplink communications signal detector 233 and the clock frequency of the clock signal 232 in the propagation delay measurement circuits 192A-192E. If the detectors 225, 232 have fixed latency, this fixed latency can be calculated and removed from the determined propagation delay. If one assumes a purely random nature of latency, one can express the standard deviation of latency delay.

$$\sigma_{delay} = \sqrt{\sigma^2_{clock} + \sigma^2_{tx\_edge} + \sigma^2_{rx\_edge}} / \sqrt{n\_samplos}$$

For example, if the clock period of the clock signal 232 is 1 nanosecond (ns), and the transmit edge (tx_edge) and receive edge (rx_edge) detection delay of the detectors 225, 233 is a standard deviation of 2 ns, the final measurement standard deviation is 2.88 ns. Using 2 ns clock periods in the clock signal 232 would produce standard deviation of 3.05 ns. If one were to use a ten (10) measurement sample, the overall standard deviation is reduced to less than approximately 1 ns. Inherent resolution of a single measurement is defined by a clock period, (1 or 2 ns). Resolution can be improved by taking more samples. Translated into optical fiber length, one could estimate less than 1 meter (m) resolution.

Figure 12:
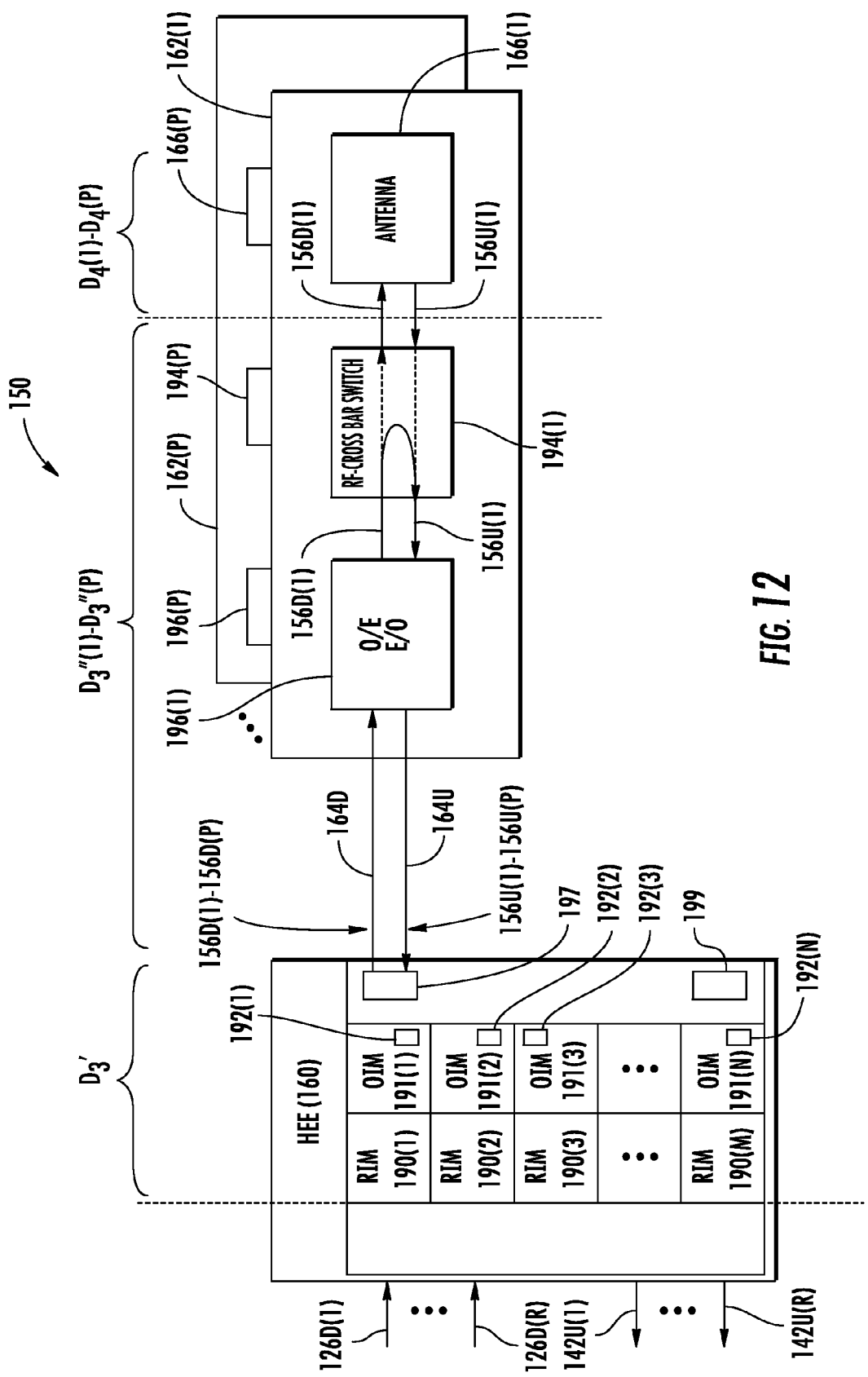
FIG. 12 is a schematic diagram of determining propagation delay of optical fiber within an exemplary optical fiber-based distributed antenna system.

It may be desired to only determine the propagation delay D3″ of the downlink and uplink communications medium 164D, 164U in the distributed antenna system 150 in FIGS. 7 and 9. This is opposed to determining the total propagation delay $D_3$ comprised of the HEE 160 propagation delay $D_3'$ and the downlink and uplink communications medium 164D, 164U propagation delay $D_3''$, as discussed above. In this regard, FIG. 12 is a schematic diagram of the distributed antenna system 150 in FIGS. 7 and 9. However, the propagation delay measurement circuits 192 are disposed in each of the OIMs 191(1)-191(N) as propagation delay measurement circuits 192(1)-192(N). In this regard, the propagation delay measurement circuits 192(1)-192(N) can measure the propagation delay of the communication paths between the downlink communications medium 164D and the return uplink communications medium 164U between the OIMs 191(1)-191(N) and the RAUs 162(1)-162(P). The processes previously described with regard to FIG. 10 to measure the total propagation delays in the distributed antenna system 150 is equally applicable to this embodiment for measuring the propagation delays in the communication paths between the downlink communications medium 164D and the return uplink communications medium 164U.

Figure 13:
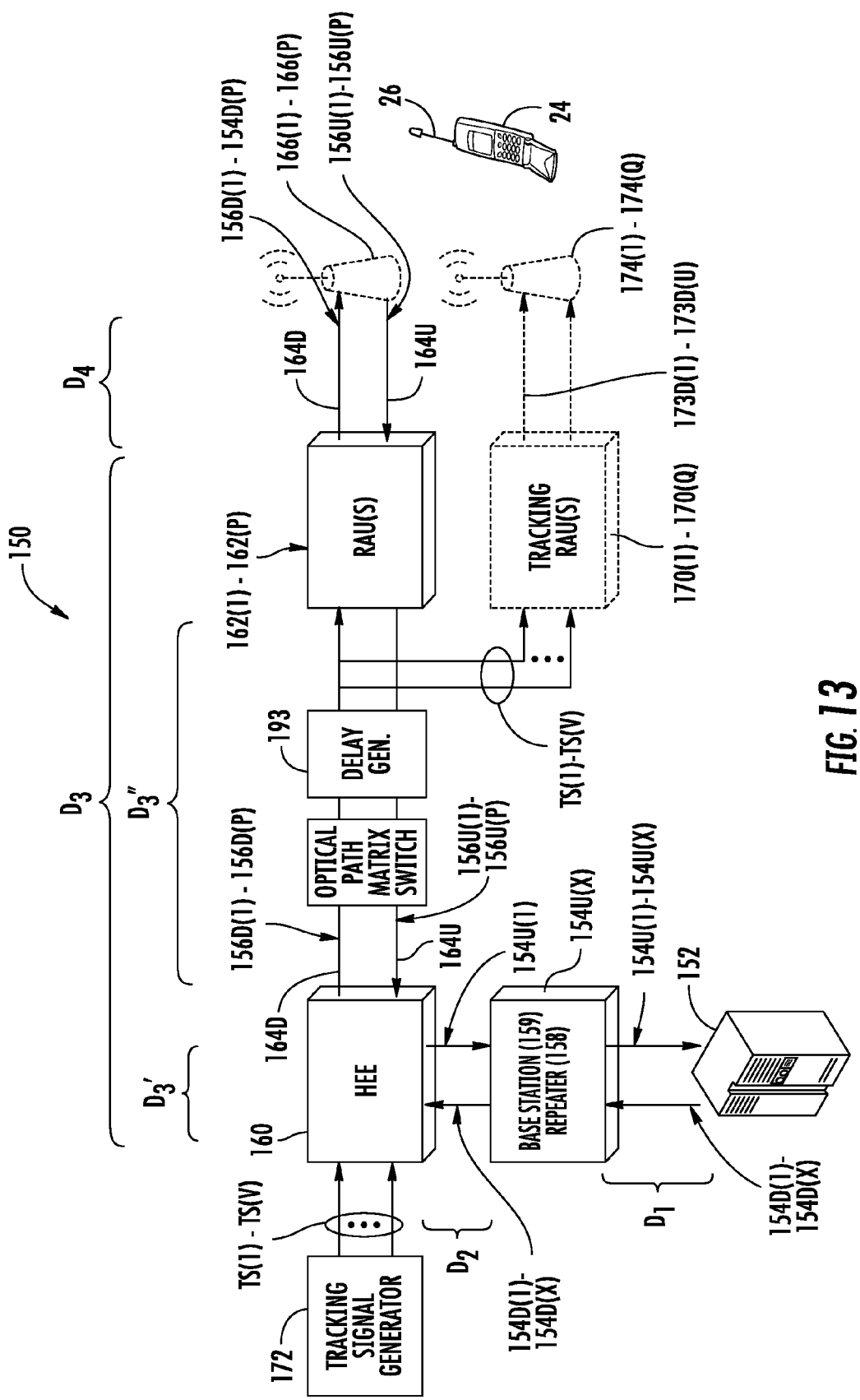
FIG. 13 is a schematic diagram of providing additional propagation delay in an exemplary optical fiber-based distributed antenna system.

Variations in propagation delays in a downlink and/or uplink communications medium as a result of variations in length variations in placement of RAUs may not be distinguishable, or may not be distinguishable for all RAUs. Also, it may be desired to equalize propagation delay caused by variations in propagation delays in a downlink and uplink communications medium, such as by result of variations in length variations in placement of RAUs. In this regard, FIG. 13 illustrates a distributed antenna system 150′ that includes common components indicated by common element numbers with the distributed antenna system 150 in FIG. 7. However, additional propagation delay can be provided in the downlink and uplink communications medium 164D, 164U by a propagation delay generator 193. In this regard, a propagation delay generator 193 is provided and is configured to be controlled to add or otherwise change propagation delay to the downlink and uplink communications medium 164D, 164U. As an example, the propagation delay generator 193 may contain a plurality of delay paths vary in propagation delay. For example, different lengths of optical fiber may be provided in the propagation delay generator 193 to represent different additional propagation delays.

With continuing reference to FIG. 13, the specific downlink and uplink communications medium 164D, 164U in which the additional propagation delay is added is controlled by an optical path matrix switch 195. The optical path matrix switch 195 is configured to control in which path in the propagation delay generator 193 a given downlink and/or uplink communications medium 164D, 164U takes in the propagation delay generator 193. The switched path selected controls the amount of additional propagation delay added by the propagation delay generator 193 to a given downlink and/or uplink communications medium 164D, 164U, and thus to the RAU 162 connected to the given downlink and uplink communications medium 164D, 164U. The propagation delay generator 193 and optical path matrix switch 195 may include a controller, such as a microprocessor or microcontroller, that is configured to communicate with the HEE 160 as an example. The HEE 160 may control the optical path matrix switch 195 to control the selected propagation delay among of propagation delays provided by the propagation delay generator 193 for a given downlink and/or uplink communications medium 164D, 164U.

Figure 14:
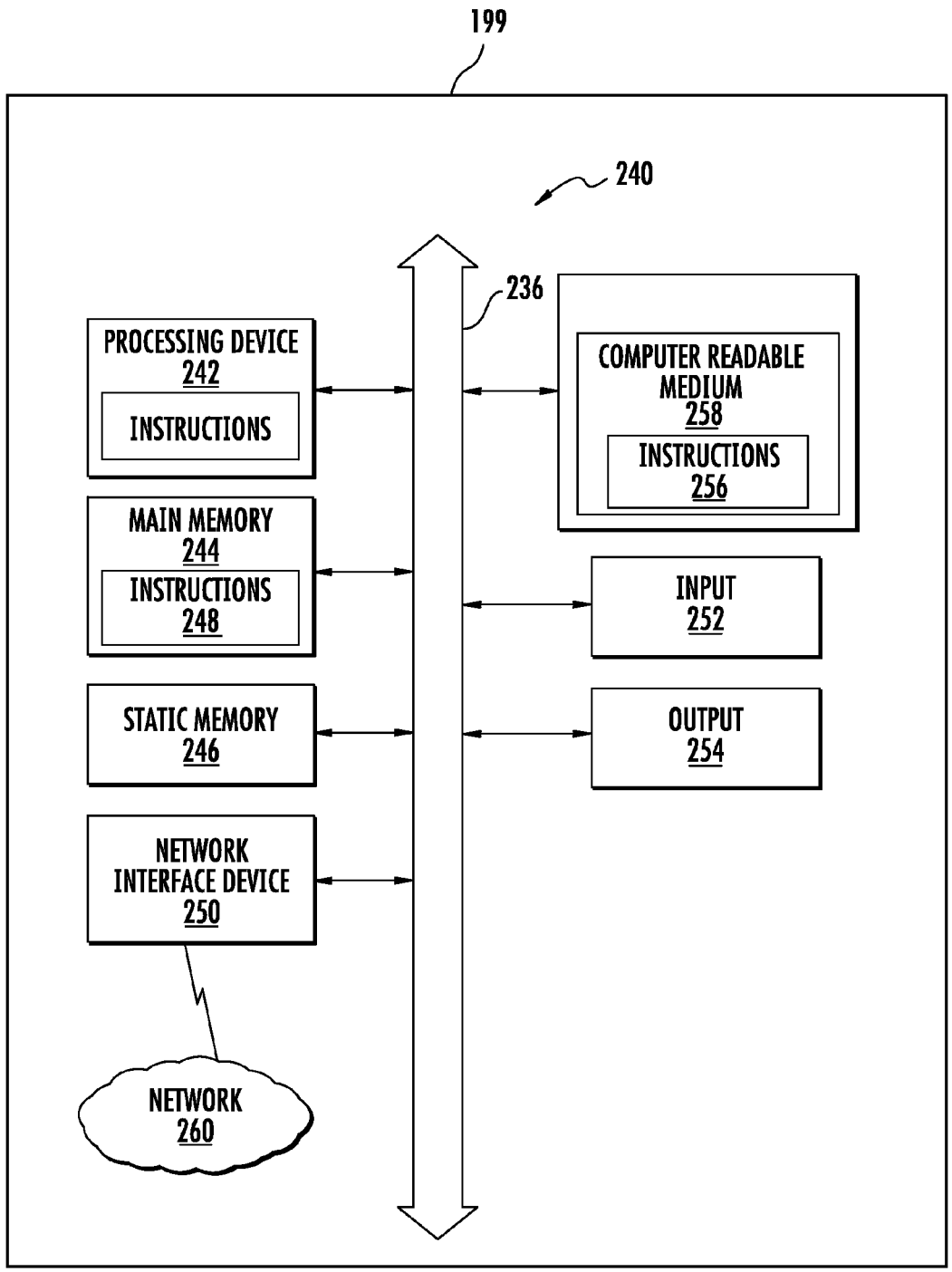
FIG. 14 is a schematic diagram of a generalized representation of an exemplary computer system that can be included in any of the modules provided in the exemplary distributed antenna systems and/or their components described herein, including but not limited to a head end controller (HEC), wherein the exemplary computer system is adapted to execute instructions from an exemplary computer-readable media.

FIG. 14 is a schematic diagram representation of additional detail regarding the exemplary HEC 199 and/or any other microprocessor, microcontroller, or controller disclosed herein in the exemplary form of an exemplary computer system 240 adapted to execute instructions from an exemplary computer-readable medium to perform power management functions. The HEC 199 may be included in the HEE 160 as previously discussed. In this regard, the HEC 199 may comprise the computer system 240 within which a set of instructions for causing the HEC 199 to perform any one or more of the methodologies discussed herein may be executed. The HEC 199 may be connected (e.g., networked) to other machines in a LAN, an intranet, an extranet, or the Internet. The HEC 199 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The HEC 199 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 240 of the HEC 199 in this embodiment includes a processing device or processor 242, a main memory 244 (e.g., read-only memory (ROM), flash memory, dynamic random access memory (DRAM) such as synchronous DRAM (SDRAM), etc.), and a static memory 246 (e.g., flash memory, static random access memory (SRAM), etc.), which may communicate with each other via the data bus 236. Alternatively, the processing device 242 may be connected to the main memory 244 and/or static memory 246 directly or via some other connectivity means. The processing device 242 may be a controller, and the main memory 244 or static memory 246 may be any type of memory, each of which can be included in the HEE 160.

The processing device 242 represents one or more general-purpose processing devices such as a microprocessor, central processing unit, or the like. More particularly, the processing device 242 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 242 is configured to execute processing logic in instructions 248 for performing the operations and steps discussed herein.

The computer system 240 may further include a network interface device 250. The computer system 240 also may or may not include an input 252 to receive input and selections to be communicated to the computer system 240 when executing instructions. The computer system 240 also may or may not include an output 254, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 240 may or may not include a data storage device that includes instructions 256 stored in a computer-readable medium 258 embodying any one or more of the propagation delay measurement methodologies or functions described herein. The instructions 256 may also reside, completely or at least partially, within the main memory 244 and/or within the processing device 242 during execution thereof by the computer system 240, the main memory 244 and the processing device 242 also constituting computer-readable medium. The instructions 256 may further be transmitted or received over a network 260 via the network interface device 250.

While the computer-readable medium 258 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the distributed antenna systems could include any type or number of communications mediums, including but not limited to electrical conductors, optical fiber, and air (i.e., wireless transmission). The distributed antenna systems may distribute any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A distributed antenna system apparatus, comprising:
   at least one downlink radio frequency (RF) interface configured to receive downlink RF signals and distribute the downlink RF signals over at least one downlink communications medium to one or more remote antenna units (RAUs);
   at least one uplink RF interface configured to receive uplink RF signals over at least one uplink communications medium from the one or more RAUs;
   at least one propagation delay measurement circuit communicatively coupled to the at least one downlink RF interface and the at least one uplink RF interface and configured to measure propagation delay between the distribution of the downlink RF signals by the at least one downlink RF interface and the receipt of the downlink RF signals as uplink RF signals by the at least one uplink RF interface; and
   a controller communicatively coupled to the at least one propagation delay measurement circuit and configured to:
      communicate to an RAU among the one or more RAUs to return received downlink RF signals as uplink RF signals to the at least one uplink RF interface;
      activate the at least one downlink RF interface to distribute the received downlink RF signals to the RAU among the one or more RAUs; and
      determine the propagation delay as a function of delay between the at least one downlink RF interface and the RAU among the one or more RAUs, and as a function of delay between the RAU among the one or more RAUs and the at least one uplink RF interface from the at least one propagation delay measurement circuit.

2. The distributed antenna system apparatus of claim 1, wherein the at least one downlink communications medium and the at least one uplink communications medium includes at least one optical fiber medium.

3. The distributed antenna system apparatus of claim 2, wherein the at least one downlink communications medium and the at least one uplink communications medium includes at least one electrical conductor medium.

4. The distributed antenna system apparatus of claim 1, wherein the at least one downlink communications medium and the at least one uplink communications medium includes at least one air media.

5. The distributed antenna system apparatus of claim 1, wherein the controller is further configured to store the propagation delay in memory.

6. The distributed antenna system apparatus of claim 1, wherein the controller is further configured to communicate the propagation delay over a network.

7. The distributed antenna system apparatus of claim 1, wherein the controller is further configured to communicate to the RAU among the one or more RAUs to not return received downlink RF signals as uplink RF signals to the at least one uplink RF interface.

8. The distributed antenna system apparatus of claim 1, wherein the controller is further configured to, for each selected RAU among the one or more RAUs:
  communicate to the selected RAU among the one or more RAUs to return received downlink RF signals as uplink RF signals to the at least one uplink RF interface;
  activate the at least one downlink RF interface to distribute the received downlink RF signals to the selected RAU among the one or more RAUs; and
  determine the propagation delay between the at least one downlink RF interface and the selected RAU among the one or more RAUs from the at least one propagation delay measurement circuit.

9. The distributed antenna system apparatus of claim 1, wherein the at least one propagation delay measurement circuit is configured to measure the propagation delay between the at least one downlink RF interface and the RAU among the one or more RAUs.

10. The distributed antenna system apparatus of claim 9, wherein the at least one propagation delay measurement circuit is located at the at least one downlink RF interface to measure the propagation delay between the at least one downlink RF interface and the RAU among the one or more RAUs.

11. The distributed antenna system apparatus of claim 1, wherein the at least one propagation delay measurement circuit is configured to measure the propagation delay between the at least one downlink communications medium and the at least one uplink communications medium.

12. The distributed antenna system apparatus of claim 1, wherein the at least one downlink RF interface is comprised of at least one radio interface module.

13. The distributed antenna system apparatus of claim 1, further comprising at least one optical RF interface providing at least a portion of the at least one downlink RF interface and the at least one uplink RF interface, the at least one optical RF interface configured to:
  receive the downlink RF signals as downlink electrical RF signals;
  convert the received downlink electrical RF signals to downlink optical RF signals;
  receive the uplink RF signals from the one or more RAUs as uplink optical RF signals; and
  convert the received uplink optical RF signals into uplink electrical RF signals.

14. The distributed antenna system apparatus of claim 13, wherein the at least one propagation delay measurement circuit is located at the at least one optical RF interface to measure the propagation delay between the at least one downlink RF interface and the RAU among the one or more RAUs.

15. The distributed antenna system apparatus of claim 14, wherein the at least one propagation delay measurement circuit is configured to measure the propagation delay between the at least one downlink communications medium and the at least one uplink communications medium.

16. The distributed antenna system apparatus of claim 1, wherein the at least one propagation delay measurement circuit is comprised of:
  a downlink communications signal detector configured to detect the downlink RF signals;
  an uplink communications signal detector configured to detect the uplink RF signals; and
  a counter configured to count propagation delay between the detection of the downlink RF signals by the downlink communications signal detector and the detection of the uplink RF signals by the uplink communications signal detector.

17. The distributed antenna system apparatus of claim 1, wherein the at least one downlink RF interface is comprised of a plurality of downlink RF interfaces and the at least one uplink RF interface is comprised of a plurality of uplink RF interfaces, and
wherein the at least one propagation delay measurement circuit is comprised of a plurality of propagation delay measurement circuits, each of the plurality of propagation delay measurement circuits communicatively coupled to one downlink RF interface among the plurality of downlink RF interfaces and one uplink RF interface among the plurality of uplink RF interfaces.

18. The distributed antenna system apparatus of claim 1, wherein the controller is further configured to communicate to the RAU among the one or more RAUs over the at least one downlink communications medium to return received downlink RF signals as uplink RF signals to the at least one uplink RF interface.

19. The distributed antenna system apparatus of claim 1, further comprising a propagation delay generator configured to add additional propagation delay to at least one of the at least one downlink communications medium and the at least one uplink communications medium.

20. The distributed antenna system apparatus of claim 19, wherein the propagation delay generator is configured to equal the propagation delay between each of the at least one of the at least one downlink communications medium and the at least one uplink communications medium.

21. A method of determining propagation delay in a distributed antenna system apparatus, comprising:
  communicating to a remote antenna unit (RAU) among one or more RAUs to return received downlink radio frequency (RF) signals from at least one downlink RF interface as uplink RF signals to at least one uplink RF interface;
  activating the at least one downlink RF interface to distribute the received downlink RF signals to the RAU among the one or more RAUs;
  distributing the downlink RF signals to the RAU among the one or more RAUs over at least one downlink communications medium;
  receiving the distributed downlink RF signals as the uplink RF signals from the RAU among the one or more RAUs over at least one uplink communications medium; and
  determining propagation delay using at least one propagation delay measurement circuit as a function of delay between the at least one downlink RF interface and the RAU among the one or more RAUs, and as a function of delay between the RAU among the one or more RAUs and the at least one uplink RF interface.

22. The method of claim 21, further comprising storing the propagation delay in memory, and communicating the propagation delay over a network.

23. The method of claim 21, further comprising communicating to the RAU among the one or more RAUs to not return received downlink RF signals as uplink RF signals to the at least one uplink RF interface.

24. The method of claim 21, wherein, for each selected RAU among the one or more RAUs, comprising:
communicating to the selected RAU among the one or more RAUs to return received downlink RF signals as uplink RF signals to the at least one uplink RF interface;
activating the at least one downlink RF interface to distribute the received downlink RF signals to the selected RAU among the one or more RAUs; and
determining the propagation delay between the at least one downlink RF interface and the selected RAU among the one or more RAUs from the at least one propagation delay measurement circuit.

25. The method of claim 21, further comprising:
receiving the downlink RF signals as downlink electrical RF signals at at least one optical RF interface providing at least a portion of the at least one downlink RF interface and the at least one uplink RF interface;
converting the received downlink electrical RF signals to downlink optical RF signals at the at least one optical RF interface;
receiving the uplink RF signals from the one or more RAUs as uplink optical RF signals at the at least one optical RF interface; and
converting the received uplink optical RF signals into uplink electrical RF signals at the at least one optical RF interface.

26. The method of claim 25, wherein determining the propagation delay further comprises measuring the propagation delay between the at least one downlink RF interface and the RAU among the one or more RAUs using at least one propagation delay measurement circuit located at the at least one optical RF interface.

27. The method of claim 21, wherein determining the propagation delay further comprises:
detecting the downlink RF signals distributed on the at least one downlink communications medium;
detecting the uplink RF signals received on the at least one downlink communications medium in response to the distribution of the downlink RF signals on the at least one downlink communications medium; and
counting, using a propagation delay counter, the propagation delay between the detection of the downlink RF signals by a downlink communications signal detector and the detection of the uplink RF signals by an uplink communications signal detector.

* * * * *